(12) United States Patent
Volkerink et al.

(10) Patent No.: US 11,916,651 B1
(45) Date of Patent: Feb. 27, 2024

(54) MANAGING SATELLITE COMMUNICATIONS IN FLEXIBLE FORM FACTORS

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 87 days.

(21) Appl. No.: 17/449,862

(22) Filed: Oct. 4, 2021

Related U.S. Application Data

(63) Continuation-in-part of application No. 16/923,060, filed on Jul. 7, 2020, now Pat. No. 11,580,826.

(60) Provisional application No. 63/087,226, filed on Oct. 4, 2020, provisional application No. 63/087,223, filed on Oct. 4, 2020, provisional application No. 62/871,685, filed on Jul. 8, 2019.

(51) Int. Cl.
   *G08B 5/36* (2006.01)
   *H04B 7/185* (2006.01)
   *G16Y 40/60* (2020.01)

(52) U.S. Cl.
   CPC ..... *H04B 7/18519* (2013.01); *H04B 7/18513* (2013.01); *G16Y 40/60* (2020.01)

(58) Field of Classification Search
   CPC .............. H04B 7/18519; H04B 7/18513
   See application file for complete search history.

(56) References Cited

U.S. PATENT DOCUMENTS

| | | | |
|---|---|---|---|
| 11,115,732 B2 | 9/2021 | Lucrecio et al. | |
| 2014/0293059 A1* | 10/2014 | Park | H04W 4/029 |
| | | | 348/158 |
| 2018/0006710 A1* | 1/2018 | Buer | H04B 7/18517 |
| 2019/0037362 A1 | 1/2019 | Nogueira-Nine | |
| 2021/0410198 A1* | 12/2021 | Qiao | H04W 74/0841 |
| 2022/0321209 A1* | 10/2022 | Wang | H04W 72/046 |
| 2022/0322263 A1* | 10/2022 | Sengupta | H04W 84/06 |
| 2023/0138213 A1* | 5/2023 | Grant | H04W 72/541 |
| | | | 370/316 |

FOREIGN PATENT DOCUMENTS

| | | |
|---|---|---|
| AU | 2018204317 A1 | 6/2018 |
| AU | 2018250358 A1 | 10/2018 |
| CA | 3061878 A1 | 11/2018 |
| CA | 3008512 A1 | 12/2018 |

* cited by examiner

*Primary Examiner* — Hongmin Fan

(57) ABSTRACT

A node of a wireless sensing system automatically switches from using a primary satellite network to using a backup satellite network. The node uses primary parameters of the primary satellite network to determine when the primary satellite network is unavailable. The node determines, based on backup parameters for the backup satellite network, an expected availability of the backup satellite network, and establishes, during the expected availability, a communication connection with the backup satellite network. To reduce battery usage of at least one tape node of a wireless tracking system, a gateway node receives a wireless satellite signal from at least one navigation satellite of a satellite navigation system, decodes Ephemeris data therefrom, and distributes the Ephemeris data to the at least one tape node via a low-powered wireless communication interface.

20 Claims, 22 Drawing Sheets

MANAGING SATELLITE COMMUNICATIONS IN FLEXIBLE FORM FACTORS

RELATED APPLICATIONS

This application is a Continuation-in-part of U.S. patent application Ser. No. 16/923,060, titled "Line-Powered Wireless Communications Systems," filed Jul. 7, 2020 which claims priority to U.S. Patent Application Ser. No. 62/871,685, filed Jul. 8, 2019, and this application claims priority to U.S. Patent Application Ser. No. 63/087,223, titled "Managing Satellite Communications in Flexible Form Factors," filed Oct. 4, 2020, and to U.S. Patent Application No. 63/087,226, titled "Download/Upload Of Satellite Data Files Through Gateway Nodes," filed Oct. 4, 2020, each of which is incorporated in its entirety herein by reference.

FIELD OF THE DISCLOSURE

This disclosure generally relates to Industrial Internet of Things (IOT) and more particularly to optimizing satellite communication and navigation by IOT devices.

BACKGROUND

Tracking devices may be used to track people and objects (collectively referred to herein as "assets") in real time and communicate the collected tracking data (e.g., location data) to a server or client device. In a conventional Internet of Things (IOT) system, tracking devices deployed at different nodes may communicate to a central system that provides tracking data to users. In some cases, the tracking devices continuously communicate the full range of tracking data collected to the central system at all times. However, this "always-on" communication results in high-power consumption, particularly when the tracking devices are using wireless communication to send data to the central system. Situations may arise where the tracked person or object does not require the full functionality of the tracking device or only requires a limited set of functionalities.

It is often beneficial for systems to be able to connect with satellite networks to upload or download data. When choosing to establish communications with satellites, it is necessary to balance cost, reliability, and other factors. For example, proprietary or micro-satellites are less expensive to maintain, particularly for systems that do not require a constant communication connection, such as systems requiring daily or weekly updates (e.g., systems on sea containers). However, proprietary and micro-satellites are often less reliable and may experience downtime or losses of connection during times of need.

SUMMARY

In one embodiment, a method automatically switches a node of a wireless sensing system from using a primary satellite network to using a backup satellite network. The node uses primary parameters of the primary satellite network to determine when the primary satellite network is unavailable. Based on backup parameters for the backup satellite network, the node determines expected availability of the backup satellite network, and establishes, during the expected availability, a communication connection with the backup satellite network.

In another embodiment, a method distributes Ephemeris data of a satellite navigation system to at least one tape node of a wireless sensing system. A gateway node of the wireless sensing system receives a wireless satellite signal from at least one navigation satellite. The gateway node decodes the Ephemeris data from the wireless satellite signal, and transmits the Ephemeris data to the at least one tape node via a low-powered wireless communication interface.

In another embodiment, a gateway node distributes Ephemeris data of a global navigation satellite system (GNSS) to at least one tape node of a wireless sensing system. The gateway node includes: a GNSS module; a low-powered wireless communication interface; a processor; and a memory storing machine readable instructions that when executed by the processor cause the processor to: receive, using the GNSS module, the Ephemeris data in a wireless satellite signal from at least one navigation satellite; and transmit the Ephemeris data to the at least one tape node using the low-powered wireless communication interface; wherein the at least one tape node determine a current location from navigation satellite signals using the Ephemeris data without downloading the Ephemeris data from the navigation satellites.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Figure 1:
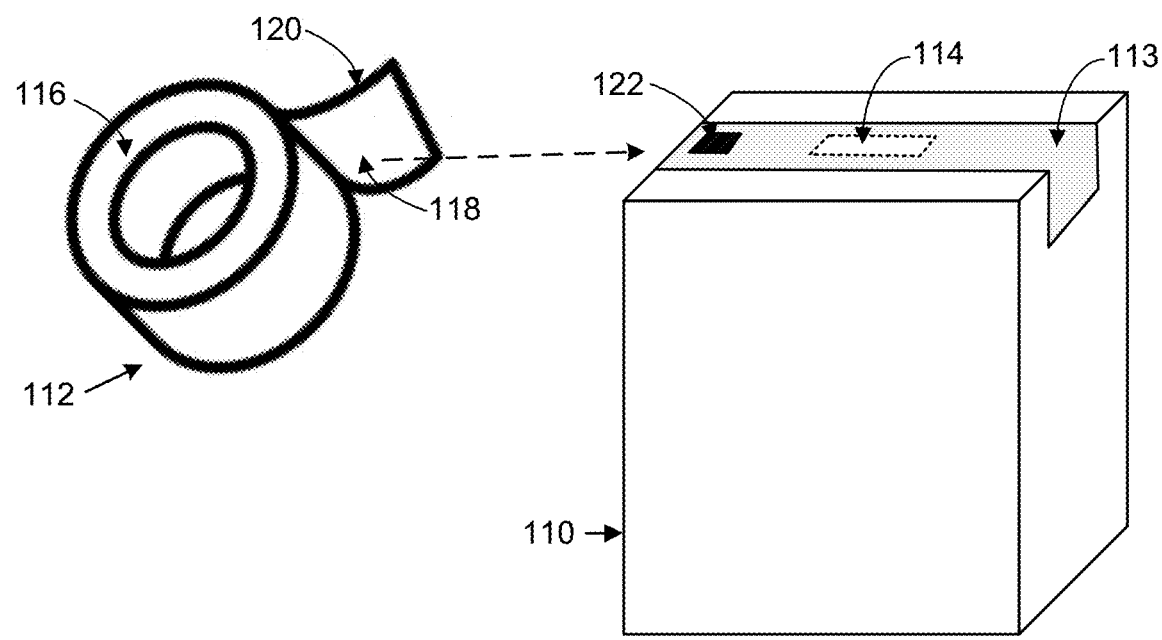
FIG. 1 shows one example adhesive tape-agent platform, including a wireless transducing circuit, used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

Adhesive Tape Platform

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
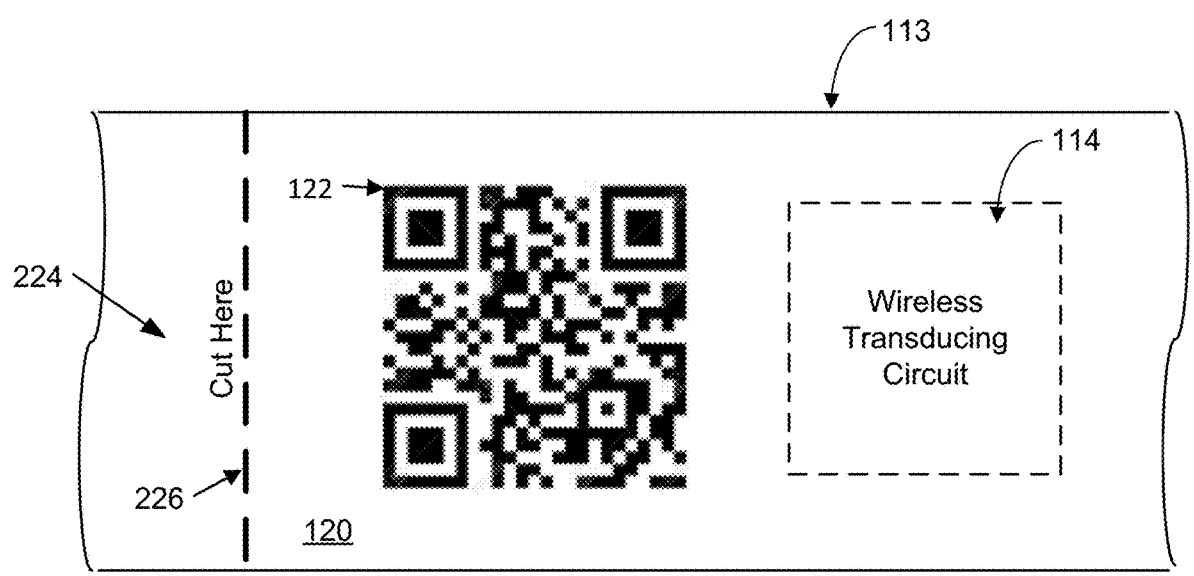
FIG. 2 shows the non-adhesive surface of the segment of the adhesive tape agent platform of FIG. 1 including writing or other markings that convey instructions, warnings, or other information to a person or machine, in embodiments.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
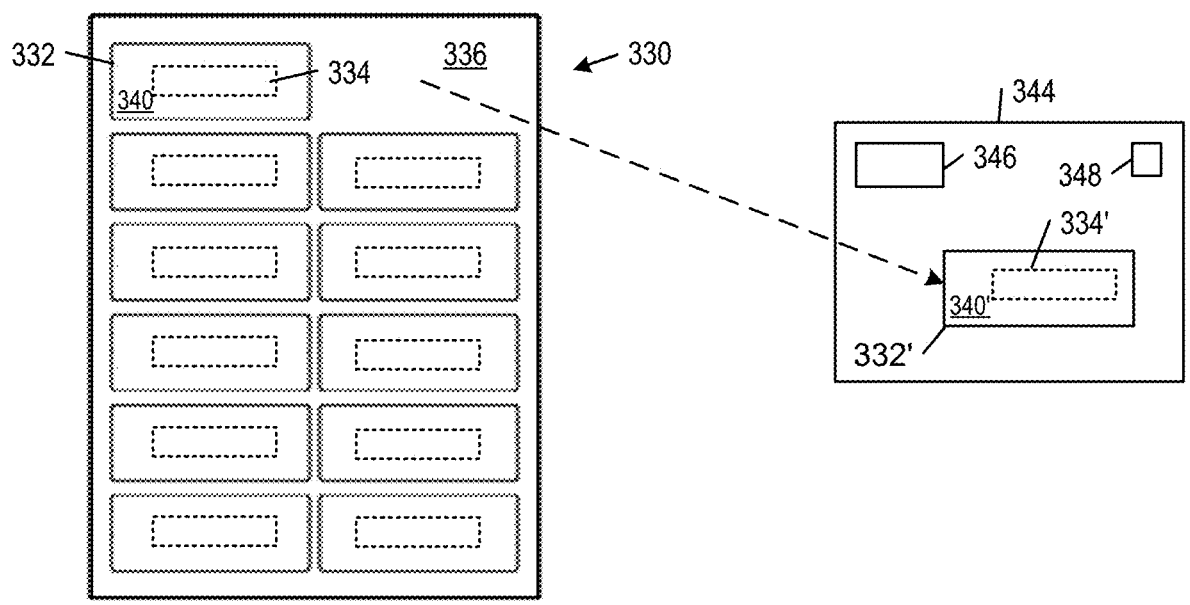
FIG. 3 shows one example adhesive tape platform that includes a set of adhesive tape platform segments on a backing sheet with a release coating that prevents the adhesive segments from adhering strongly to the backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 if FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
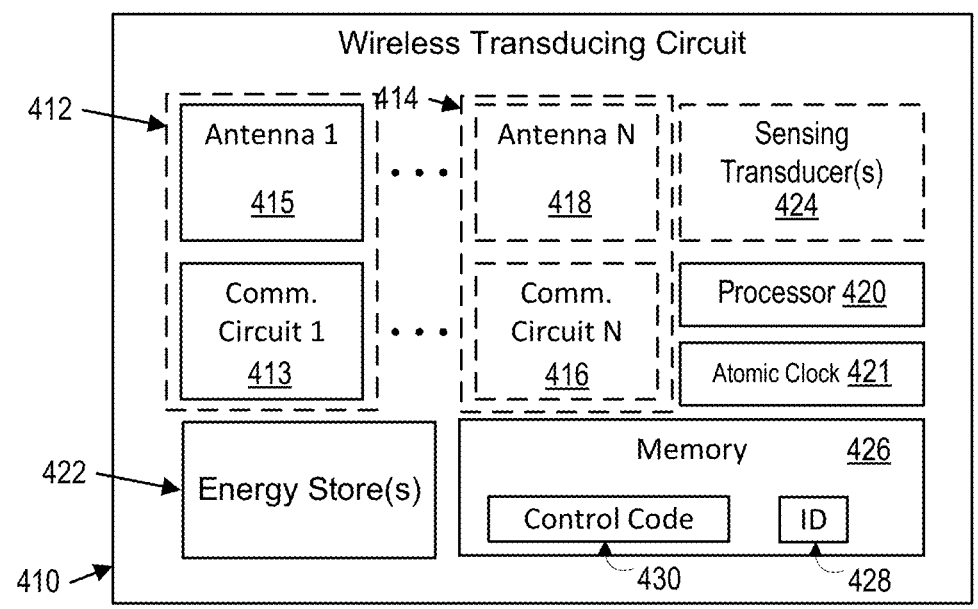
FIG. 4 is a block diagram showing example components of a wireless transducing circuit that includes one or more wireless communication modules, in embodiments.

FIG. 4 is a block diagram showing example components of a wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
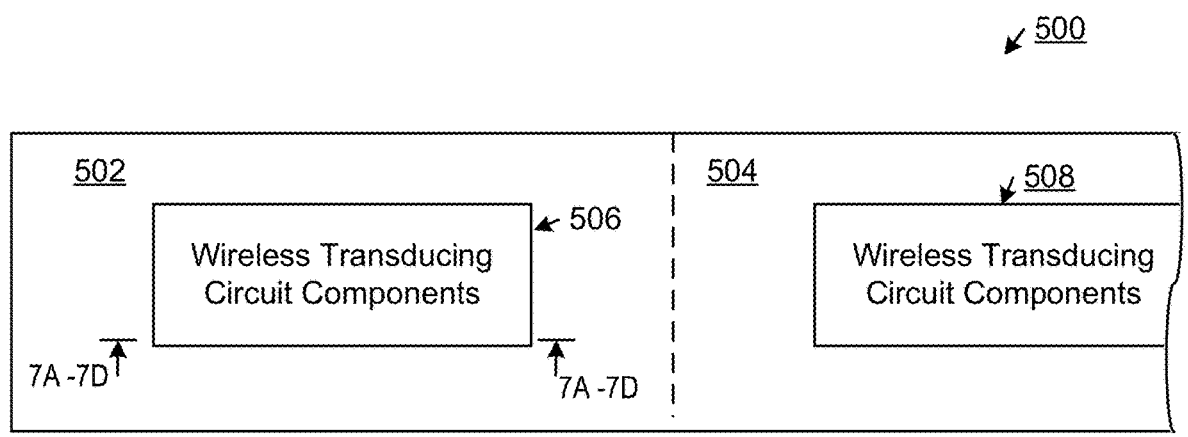
FIG. 5 is a top view of a portion of one example flexible adhesive tape platform with a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 470 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 6A:
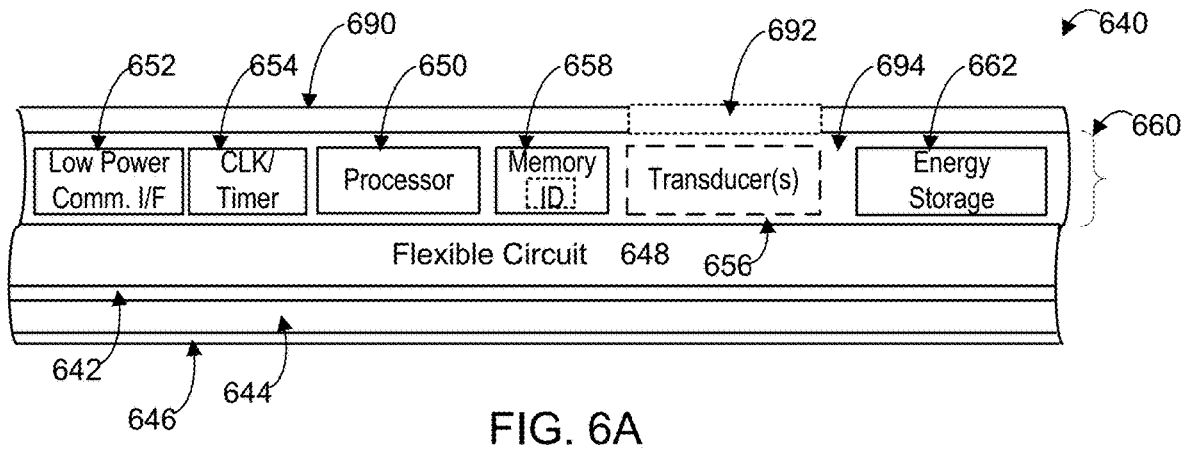
FIGS. 6A-6C show cross-sectional side views of three different types of flexible adhesive tape-agent platform segments, in embodiments.

FIG. 6A shows a cross-sectional side view of a portion of an example segment 640 of a flexible adhesive tape agent platform (e.g., platform 532 of FIG. 5) that includes a respective set of the components of the wireless transducing circuit 510 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. X10X. The segment 640 may further include a flexible cover 690, an interfacial region 692, and a flexible polymer layer 694.

Figure 6B:
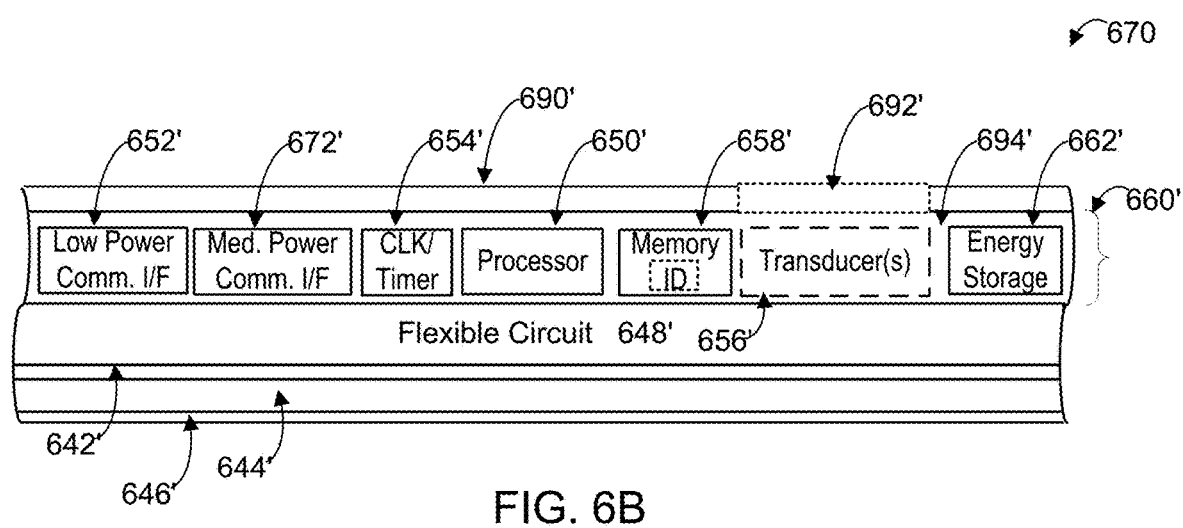

FIG. 6B shows a cross-sectional side-view of a portion of an example segment 670 of a flexible adhesive tape agent platform (e.g., platform 532 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

Figure 6C:
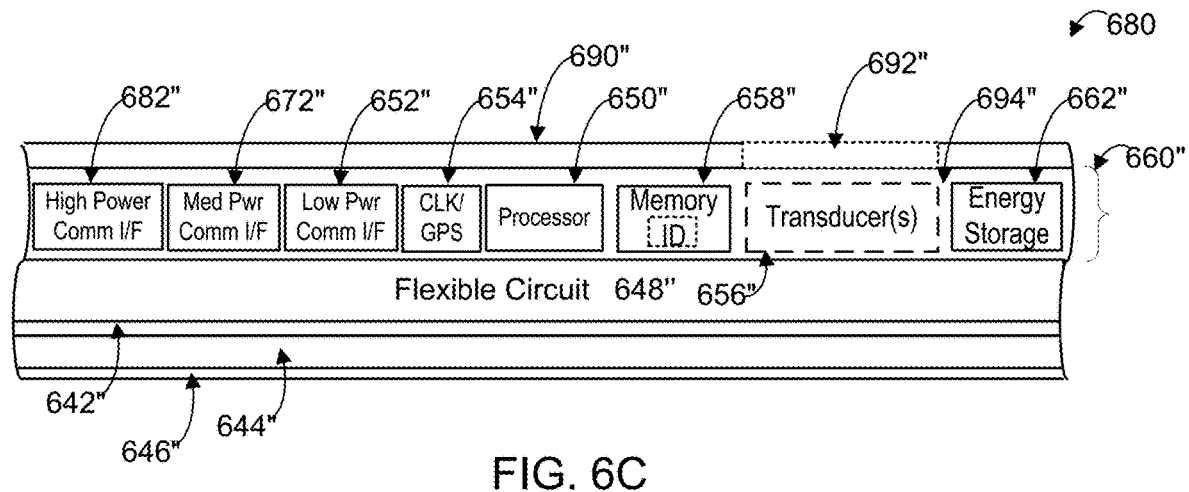

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Figure 7:
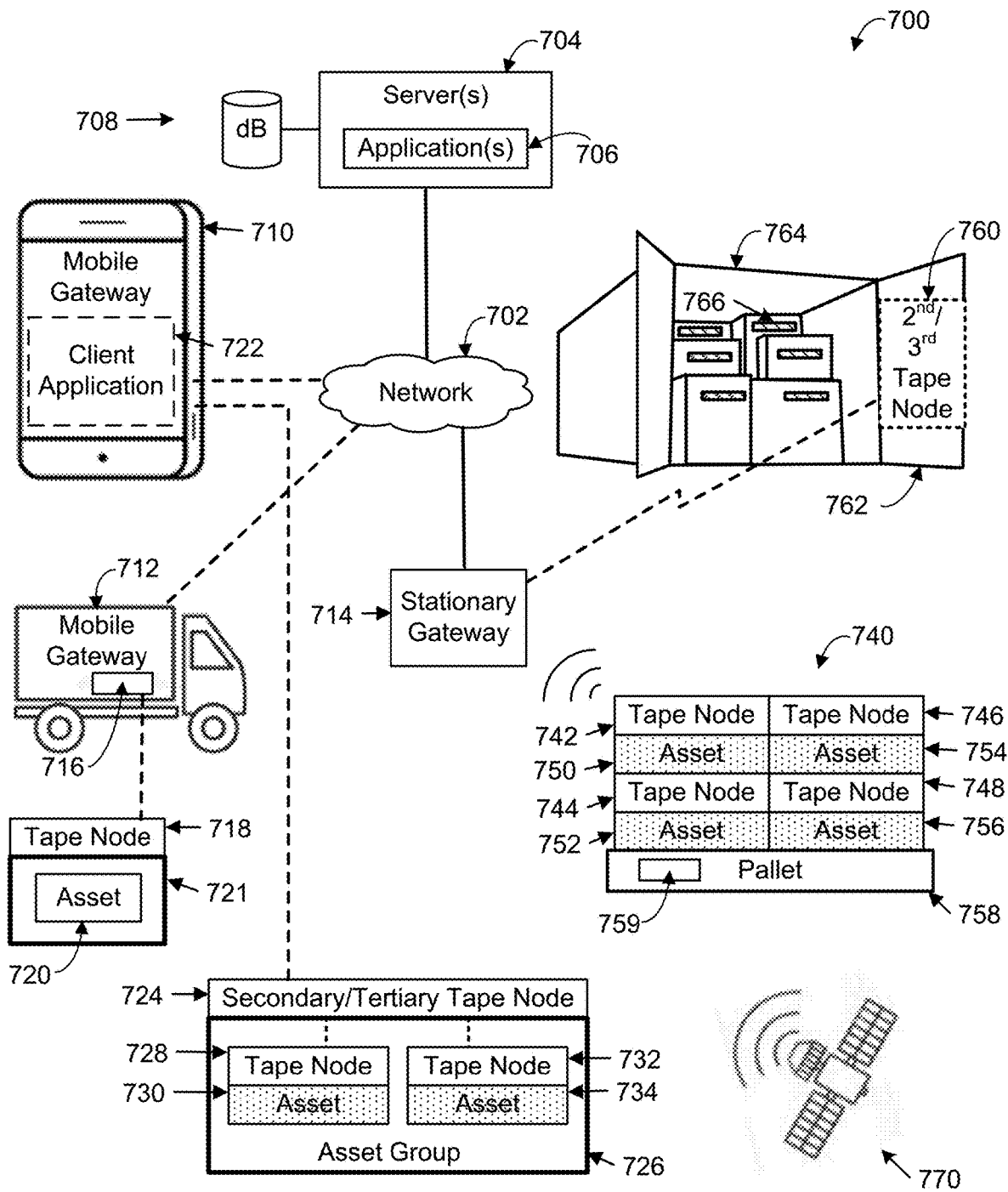
FIG. 7 shows an example network communications environment that includes a network supporting communications between servers, mobile gateways, a stationary gateway, and various types of tape nodes associated with various assets, in embodiments.

FIG. 7 shows an example network communications environment 700 (used interchangeable with "IOT system 700", "sensing system 700", "wireless sensing system 700", etc.) that includes a network 702 that supports communications between one or more servers 704 executing one or more applications of a network service 708, mobile gateways 710 (a smart device mobile gateway), 712 (a vehicle mobile gateway), a stationary gateway 714, and various types of tape nodes that are associated with various assets (e.g., parcels, equipment, tools, persons, and other things) Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 702 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a global navigation satellite system (GNSS) 770 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 720) or other stationary (e.g., stationary gateway 714) or mobile object (e.g., a, such as a delivery truck, such as mobile gateway 712) or stationary object (e.g., a structural element of a building) This process activates the tape node (e.g., the tape node 718) and causes the tape node 718 to communicate with the one or more servers 704 of the network service 708. In this process, the tape node 418 may communicate through one or more other tape nodes (e.g., the tape nodes 742, 744, 746, 748) in the communication hierarchy. In this process, the one or more servers 704 executes the network service application 706 to programmatically configure tape nodes 718, 724, 728, 732, 742, 744, 746, 748, that are deployed in the network communications environment 700.

In some examples, the one or more servers 704 communicate over the network 702 with one or more gateways 710, 712, 714 that are configured to send, transmit, forward, or relay messages to the network 702 in response to transmissions from the tape nodes 718, 724, 728, 732, 742, 744, 746, 748 that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated network of tape nodes, including tape node 718 (e.g., a master tape node) in the form of a label that is adhered to a parcel 721 (e.g., an envelope) that contains an asset 720, and is further configured to communicate with the network service 708 over the network 702. In some examples, the tape node 718 includes a lower-power wireless-communications interface of the type used in, e.g., segment 640 (shown in FIG. 6A), and the wireless communications unit 716 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 712 and a higher-power communications-interface for communicating with the network 702. In this way, the tape node 718 and wireless communications unit 716 create a hierarchical wireless network of tape nodes for transmitting, forwarding, bridging, relaying, or otherwise communicating wireless messages to, between, or on behalf of the tape node 718 in a power-efficient and cost-effective way.

In some examples, a mobile gateway 710 is a mobile phone that is operated by a human operator and executes a client application 722 that is configured by a network service to communicate with a designated set of tape nodes, including a secondary or tertiary tape node 724 that is adhered to a parcel 726 (e.g., a box), and is further configured to communicate with a server 704 over the network 702. In the illustrated example, the parcel 726 contains a first parcel labeled or sealed by a master tape node 728 and containing a first asset 730, and a second parcel labeled or sealed by a master tape node 732 and containing a second asset 734. The secondary or tertiary tape node 724 communicates with each of the master tape nodes 728, 732 and also communicates with the mobile gateway 710. In some examples, each of the master tape nodes 728, 732 includes a lower-power wireless-communications interface of the type used in, e.g., segment 640 (shown in FIG. 6A), and the secondary/tertiary tape node 724 is implemented by a tape node (e.g., segment 670 or segment 680, shown in FIGS. 6B and 6C) that includes a low-power communications interface for communicating with the master tape nodes 728, 732 contained within the parcel 726, and a higher-power communications interface for communicating with the mobile gateway 710. The secondary or tertiary tape node 724 is operable to relay wireless communications between the master tape nodes 728, 732 contained within the parcel 726 and the mobile gateway 710, and the mobile gateway 710 is operable to relay wireless communications between the secondary or tertiary tape node 724 and the server 704 over the network 702. In this way, the master tape nodes 728 and 732 and the secondary or tertiary tape node 724 create a wireless network of nodes for transmitting, forwarding, relaying, or otherwise communicating wireless messages to, between, or on behalf of the master tape nodes 728, 732, the secondary or tertiary tape node 724, and the network service (not shown) in a power-efficient and cost-effective way.

In some examples, the stationary gateway 714 is implemented by a server 704 executing a network service application 706 that is configured by the network service 708 to communicate with a designated set 740 of master tape nodes 742, 744, 746, 748 that are adhered to respective parcels containing respective assets 750, 752, 754, 756 on a pallet 758. In other examples, the stationary gateway 714 is implemented by a secondary or tertiary tape node 760 (e.g., segments 670 or 680, respectively shown in FIGS. 6B and 6C) that is adhered to, for example, a wall, column or other infrastructure component of the physical premise's environment 700, and includes a low-power communications interface for communicating with nodes within range of the stationary gateway 714 and a higher-power communications interface for communicating with the network 702.

In one embodiment, each of the master tape nodes 742-748 is a master tape node and is configured by the network service 708 to communicate individually with the stationary gateway 714, which relays communications from the master tape nodes 742-748 to the network service 708 through the stationary gateway 714 and over the network 702. In another embodiment, one of the master tape nodes 742-748 at a time is configured to transmit, forward, relay, or otherwise communicate wireless messages to, between, or on behalf of the other master nodes on the pallet 758. In this embodiment, the master tape node may be determined by the master tape nodes 742-748 or designated by the network service 708. In some examples, the master tape nodes 742-748 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 759 is adhered to the pallet 758 and is configured to perform the role of a master node for the other master tape nodes 742-748. In these ways, the master tape nodes 742-748, 759 are configurable to create different wireless networks of nodes for transmitting, forwarding, relaying, bridging, or otherwise communicating wireless messages with the network service 408 through the stationary gateway 714 and over the network 702 in a power-efficient and cost-effective way.

In the illustrated example, the stationary gateway 714 also is configured by the network service 708 to communicate with a designated network of tape nodes, including the secondary or tertiary tape node 760 that is adhered to the inside of a door 762 of a shipping container 764, and is further configured to communicate with the network service 708 over the network 702. In the illustrated example, the shipping container 764 contains a number of parcels labeled or sealed by respective master tape nodes 766 and containing respective assets. The secondary or tertiary tape node 760 communicates with each of the master tape nodes 766 within the shipping container 764 and communicates with the stationary gateway 714. In some examples, each of the master tape nodes 766 includes a low-power wireless communications-interface (e.g., the low-power wireless-communication interface 652, with reference to FIG. 6A), and the secondary or tertiary tape node 760 includes a low-power wireless-communications interface (low-power wireless-communication interfaces 652', 652", with reference to FIGS. 6B-6C) for communicating with the master tape nodes 766 contained within the shipping container 764, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 714. In some examples, either a secondary or tertiary tape node, or both, may be used, depending on whether a high-power wireless-communication interface is necessary for sufficient communication.

In some examples, when the doors of the shipping container 764 are closed, the secondary or tertiary tape node 760 is operable to communicate wirelessly with the master tape nodes 766 contained within the shipping container 764. In some embodiments, both a secondary and a tertiary node are attached to the shipping container 764. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 760 is configured to collect sensor data from master tape nodes 766 and, in some embodiments, process the collected data to generate, for example, statistics from the collected data. When the doors of the shipping container 764 are open, the secondary or tertiary tape node 760 is programmed to detect the door opening (e.g., using a photodetector or an accelerometer component of the secondary or tertiary tape node 760) and, in addition to reporting the door opening event to the network service 708, the secondary or tertiary tape node 760 is further programmed to transmit the collected data and/or the processed data in one or more wireless messages to the stationary gateway 714. The stationary gateway 714, in turn, is operable to transmit the wireless messages received from the secondary or tertiary tape node 760 to the network service 708 over the network 702. Alternatively, in some examples, the stationary gateway 714 also is operable to perform operations on the data received from the secondary or tertiary tape node 760 with the same type of data produced by the secondary or tertiary tape node 760 based on sensor data collected from the master tape nodes 742-748. In this way, the secondary or tertiary tape node 760 and master tape node 766 create a wireless network of nodes for transmitting, forwarding, relaying, or otherwise communicating wireless messages to, between, or on behalf of the master tape node 766, the secondary or tertiary tape nodes 760, and the network service 708 in a power-efficient and cost-effective way.

In an example of the embodiment shown in FIG. 7, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 718, 728, 732, 742-748, 766 are short-range tape nodes. The short-range tape nodes typically communicate with a low-power wireless-communication protocol (e.g., Bluetooth LE, Zigbee, or Z-wave). The segment 670 are typically adhered to objects (e.g., a parcel 726 and a shipping container 764) that are associated with multiple parcels that are separated from the medium-range tape nodes by a barrier or a long distance. In the illustrated example, the secondary and/or tertiary tape nodes 724 and 760 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 700.

In the illustrated example, the mobile gateway 712 and the stationary gateway 714 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 712 (e.g., a truck). In these examples, the wireless communications unit 716 may be moved to different locations in the network communications environment 700 to assist in connecting other tape nodes to the wireless communications unit 716. In some examples, the stationary gateway 714 is a tape node that may be attached to a stationary structure (e.g., a wall) in the network communications environment 700 with a known geographic location (e.g., latitude/longitude coordinates from GNSS). In these examples, other tape nodes in the environment may determine their geographic location by querying the stationary gateway 714.

In some examples, in order to conserve power, the tape nodes typically communicate according to a schedule promulgated by the network service 708. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 704, either directly or indirectly through a gateway tape node (e.g., the long-range tape node, such as wireless communication unit 716, adhered to the mobile gateway 712, or a long-range tape node, such as stationary gateway 714, that is adhered to an infrastructure component of the network communications environment 700). In other examples, the master tape node processes the information contained in the received data packets and transmits the processed information to the server 704.

Figure 8:
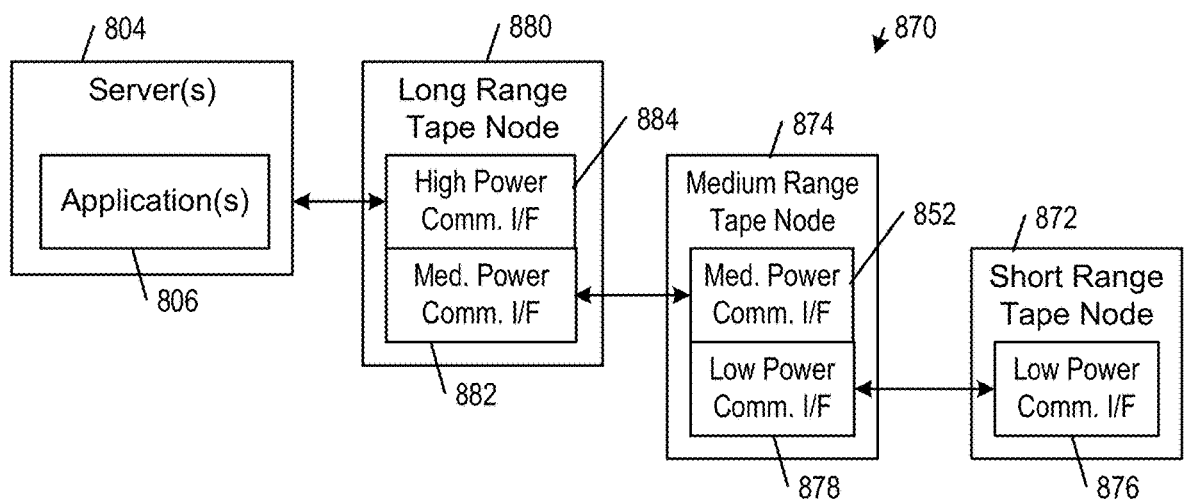
FIG. 8 shows an example hierarchical wireless communications network of tape nodes, in embodiments.

FIG. 8 shows an example hierarchical wireless communications network of tape nodes 870. In this example, the short-range tape node 872 and the medium range tape node 874 communicate with one another over their respective low power wireless communication interfaces 876, 878. The medium range tape node 874 and the long-range tape node 880 communicate with one another over their respective medium power wireless communication interfaces 878, 882. The long-range tape node 880 and the one or more network service servers 804 communicate with one another over the high-power communication interface 884. In some examples, the low power communication interfaces 876, 878 establish wireless communications with one another in accordance with the Bluetooth LE protocol, the medium power communication interfaces 886, 882 establish wireless communications with one another in accordance with the LoRa communications protocol, and the high-power communication interface 884 establishes wireless communications with the one or more network service servers 804 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 804 of the network service 808 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 804 of the network service 808. The schedule usually dictates all aspects of the communication, including the times when particular tape nodes should communicate, the mode of communication, and the contents of the communication. In one example, the one or more network service servers 804 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 804, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 804.

Figure 9:
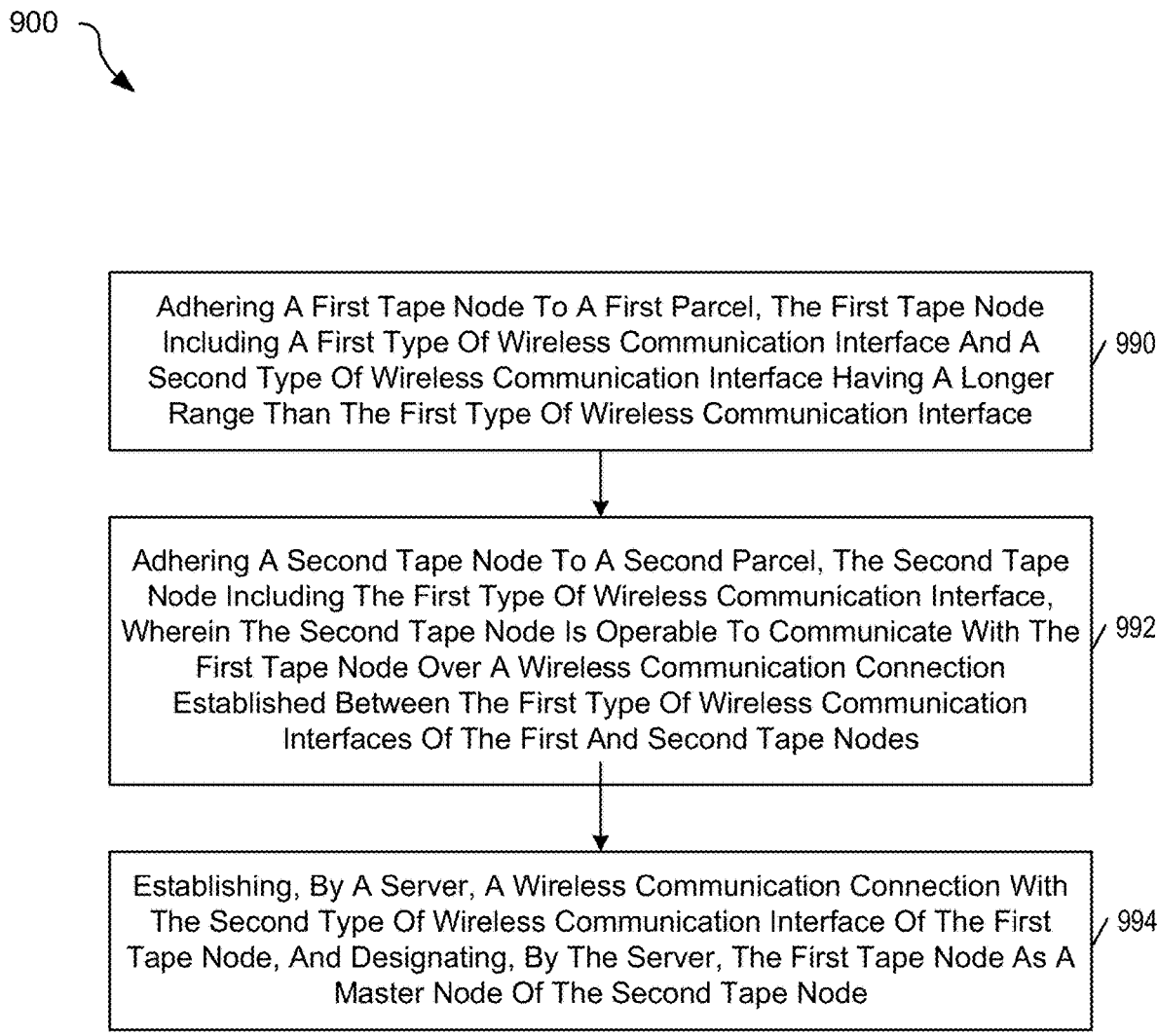
FIG. 9 is a flowchart illustrating one example method for creating a hierarchical communications network, in embodiments.

FIG. 9 is a flowchart illustrating one example method 900 for creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., the one or more network service servers 804 of a network service 808) establishes a wireless communication connection with the second type of wireless communication interface of the first tape node, and the application transmits programmatic code executable by the first tape node to function as a master tape node with respect to the second tape node (FIG. 9, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
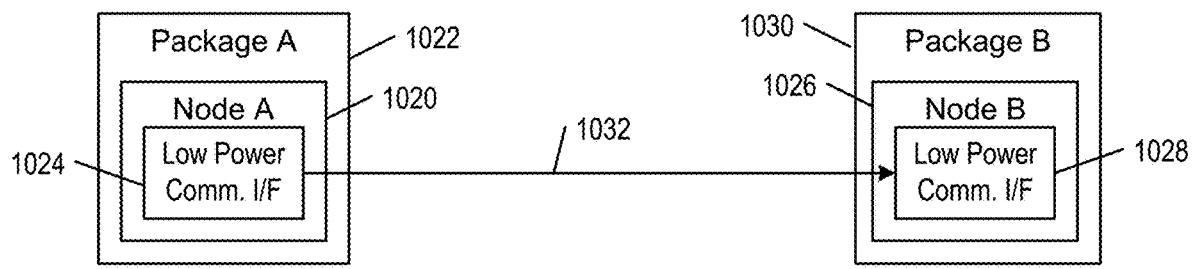
FIGS. 10A and 10B show example communication between tape nodes attached to packages, in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
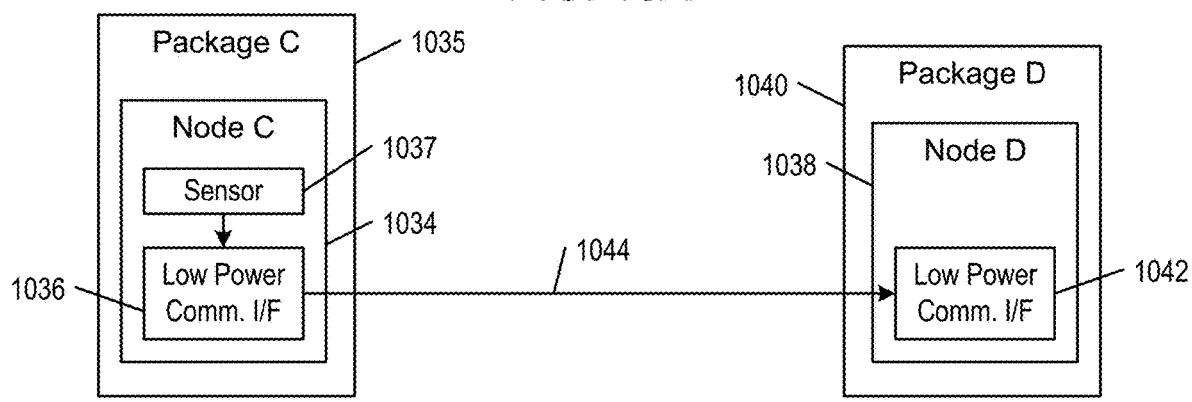

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
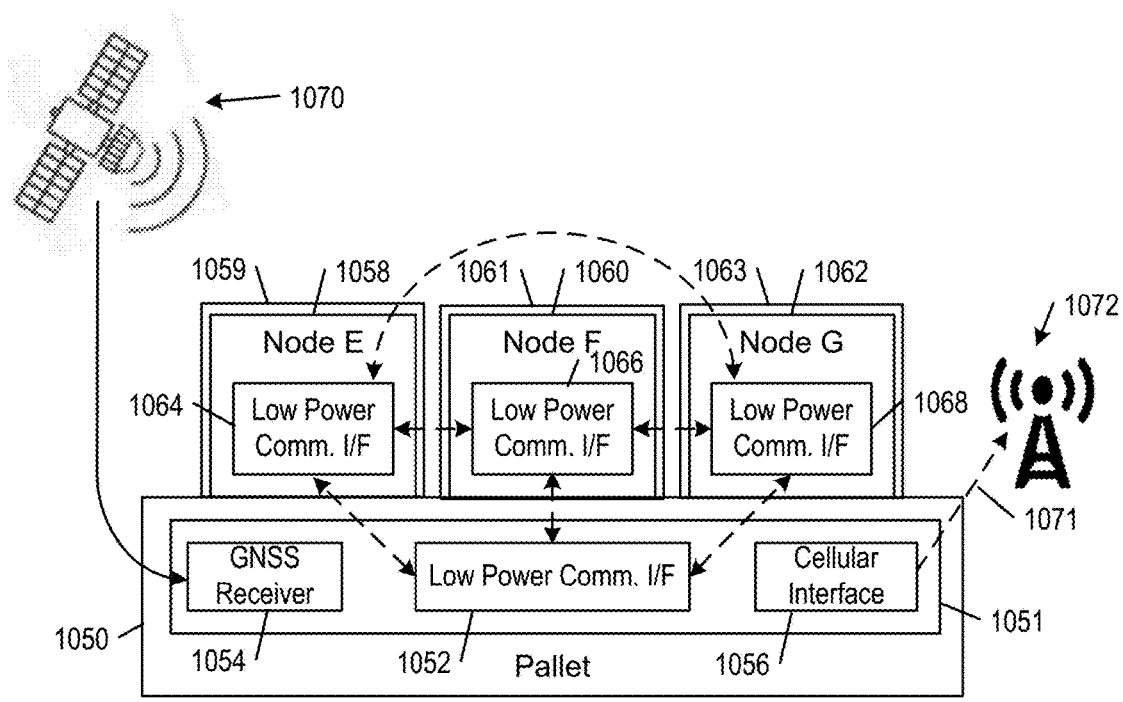
FIG. 10C shows example communication between a tape node attached to a pallet and tape nodes attached to packages on the pallet, in embodiments.

Referring to FIG. 10C, a pallet 1050 is associated with a master node 1051 that includes a low-power communications interface 1052, a GNSS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a GNSS 1070 (e.g., GPS, GLONASS, and NAVSTAR) and received by the GNSS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
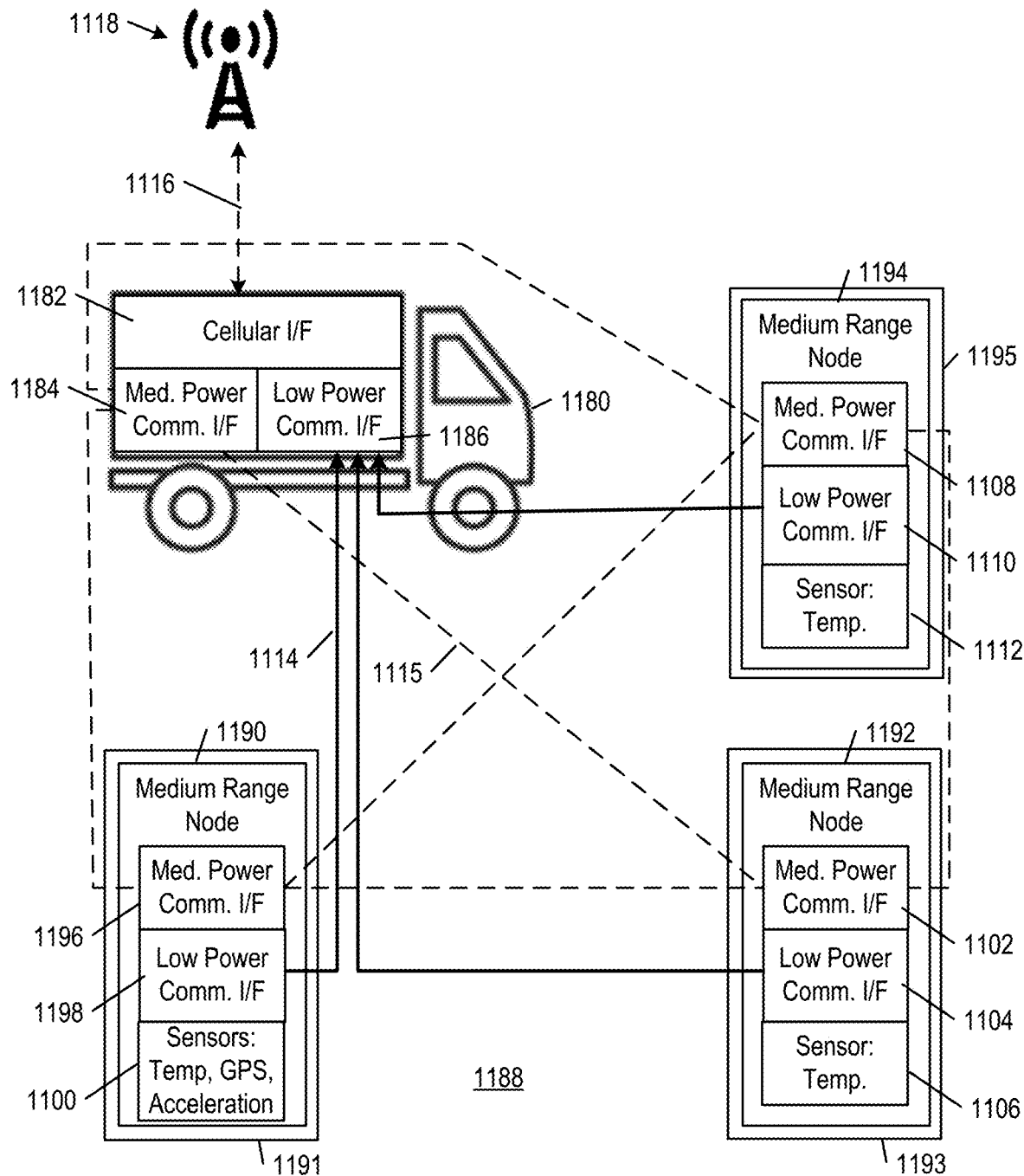
FIG. 11 shows a truck configured as a mobile node, or mobile hub, with a cellular communications interface, a medium-power communications interface, and a low power communications interface, in embodiments.

Referring to FIG. 11, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1117), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
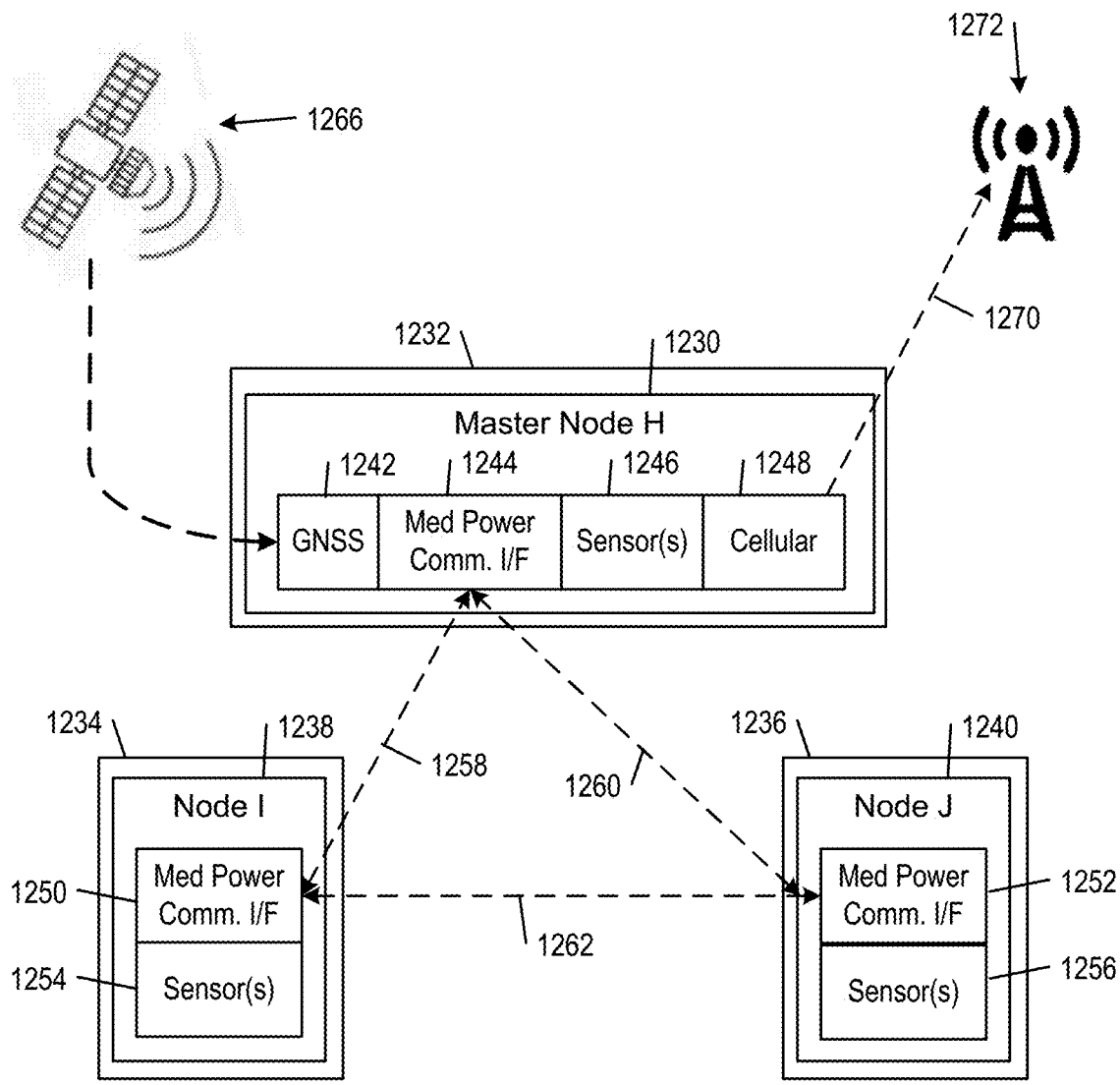
FIG. 12 shows a master node associated with a logistic item that is grouped together with other logistic items associated with peripheral nodes, in embodiments.

Referring to FIG. 12, a master node 1230 is associated with a logistic item 1232 (e.g., a package) and grouped together with other logistic items 1234, 1236 (e.g., packages) that are associated with respective peripheral nodes 1238, 1240. The master node 1230 includes a GNSS receiver 1242 (e.g., a GPS receiver), a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a GNSS 1266 (e.g., GPS, GLONASS, and NAVSTAR) and received by the GNSS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Figure 13A:
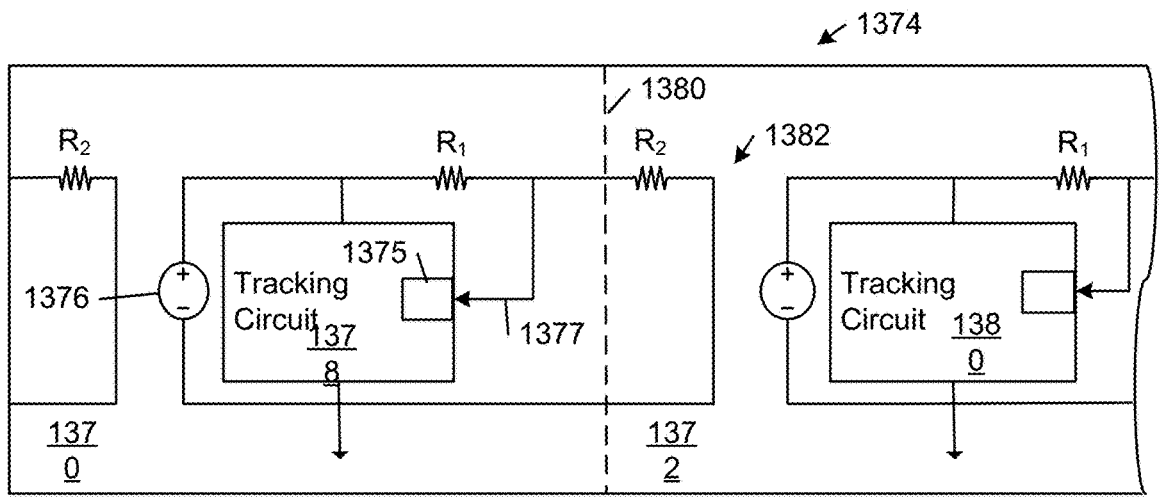
FIGS. 13A and 13B show example circuits of the tracking adhesive product for delivering power from an energy source to a tracking circuit, in embodiments.

Referring to FIG. 13A, in some examples, each of one or more of the segments 1370, 1372 of a tracking adhesive product 1374 includes a respective circuit 1375 that delivers power from the respective energy source 1376 to the respective tracking circuit 1378 (e.g., a processor and one or more wireless communications circuits) in response to an event. In some of these examples, the wake circuit 1375 is configured to transition from an off-state to an on-state when the voltage on the wake node 1377 exceeds a threshold level, at which point the wake circuit transitions to an on-state to power-on the segment 1370. In the illustrated example, this occurs when the user separates the segment from the tracking adhesive product 1374, for example, by cutting across the tracking adhesive product 1374 at a designated location (e.g., along a designated cut-line 1380). In particular, in its initial, un-cut state, a minimal amount of current flows through the resistors R1 and R2. As a result, the voltage on the wake node 1377 remains below the threshold turn-on level. After the user cuts across the tracking adhesive product 1374 along the designated cut-line 1380, the user creates an open circuit in the loop 1382, which pulls the voltage of the wake node above the threshold level and turns on the wake circuit 1375. As a result, the voltage across the energy source 1376 will appear across the tracking circuit 1378 and, thereby, turn on the segment 1370. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 1378 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
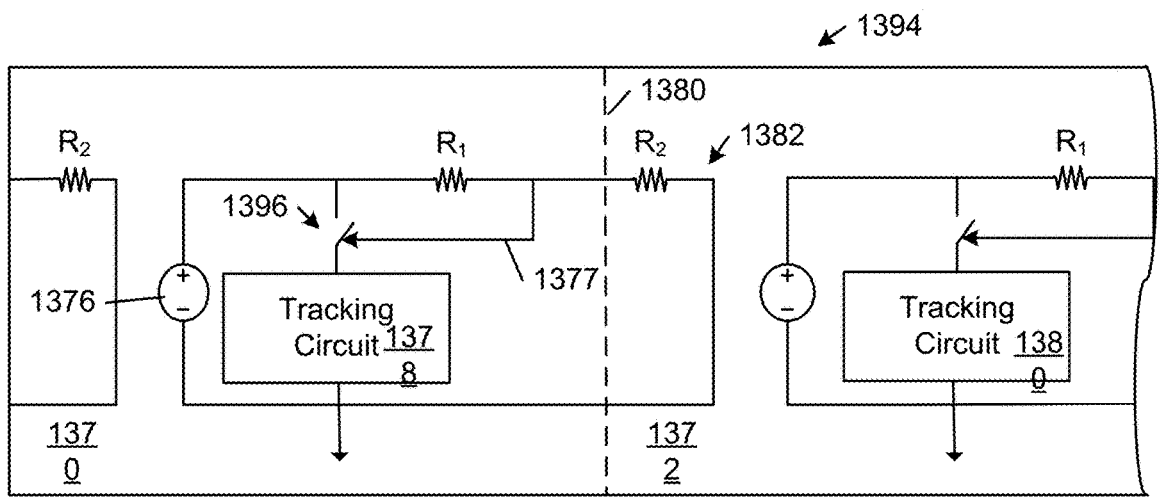

FIG. 13B shows another example of a tracking adhesive product 1394 that delivers power from the respective energy source 1376 to the respective tracking circuit 1378 (e.g., a processor and one or more wireless communications circuits) in response to an event. This example is similar in structure and operation as the tracking adhesive product 1394 shown in FIG. 13A, except that the wake circuit 1375 is replaced by a switch 1396 that is configured to transition from an open state to a closed state when the voltage on the switch node 1377 exceeds a threshold level. In the initial state of the tracking adhesive product 1394, the voltage on the switch node is below the threshold level as a result of the low current level flowing through the resistors R1 and R2. After the user cuts across the tracking adhesive product 1394 along the designated cut-line 1380, the user creates an open circuit in the loop 1382, which pulls up the voltage on the switch node above the threshold level to close the switch 1396 and turn on the tracking circuit 1378.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 13C:
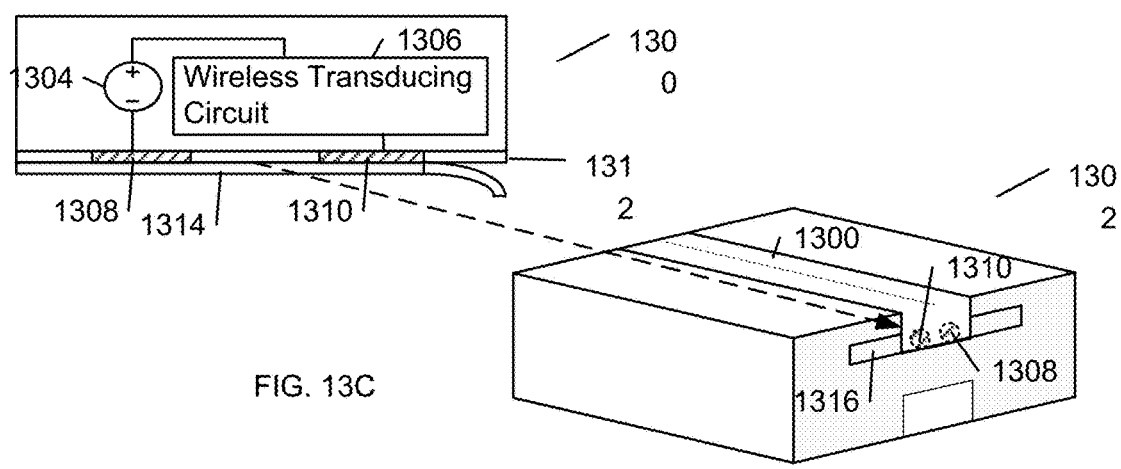
FIG. 13C shows a diagrammatic cross-sectional front view of an example adhesive tape platform and a perspective view of an example asset sealed by the adhesive tape platform, in embodiments.

FIG. 13C shows a diagrammatic cross-sectional front view of an example adhesive tape platform 1300 and a perspective view of an example asset 1302. Instead of activating the adhesive tape platform in response to separating a segment of the adhesive tape platform from a roll or a sheet of the adhesive tape platform, this example is configured to supply power from the energy source 1302 to turn on the wireless transducing circuit 1306 in response to establishing an electrical connection between two power terminals 1308, 1310 that are integrated into the adhesive tape platform. In particular, each segment of the adhesive tape platform 1300 includes a respective set of embedded tracking components, an adhesive layer 1312, and an optional backing sheet 1314 with a release coating that prevents the segments from adhering strongly to the backing sheet 1314. In some examples, the power terminals 1308, 1310 are composed of an electrically conductive material (e.g., a metal, such as copper) that may be printed or otherwise patterned and/or deposited on the backside of the adhesive tape platform 1300. In operation, the adhesive tape platform can be activated by removing the backing sheet 1314 and applying the exposed adhesive layer 1312 to a surface that includes an electrically conductive region 1316. In the illustrated embodiment, the electrically conductive region 1316 is disposed on a portion of the asset 1302. When the adhesive backside of the adhesive tape platform 1300 is adhered to the asset with the exposed terminals 1308, 1310 aligned and in contact with the electrically conductive region 1316 on the asset 1302, an electrical connection is created through the electrically conductive region 1316 between the exposed terminals 1308, 1310 that completes the circuit and turns on the wireless transducing circuit 1306. In particular embodiments, the power terminals 1308, 1310 are electrically connected to any respective nodes of the wireless transducing circuit 1306 that would result in the activation of the tracking circuit 1306 in response to the creation of an electrical connection between the power terminals 1308, 1310.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Optimizing Satellite Communications with One or More Satellites

When GNSS systems are initialized by devices for new areas, it is necessary for the device to download Ephemeris data from a satellite to determine current coordinates of the device. Because communications with satellites are not conventionally conducted over high-speed connections, downloading the Ephemeris data from satellites often requires long downloading times and high energy usage for devices. In battery-powered devices or systems having a plurality of devices, these download times and energy requirements may be detrimental to both function and lifespan.

It is often beneficial for IOT devices (e.g., segments 502, 504 of the flexible adhesive tape platform 500 of FIG. 5, tape nodes 718, 724, 728, 732, 742, 744, 746, 748 of FIG. 7, mobile gateways 710, 712, and stationary gateway 714, also referred to herein as asset tracking devices, sensing devices, etc.), particularly when the IOT device is mobile and in areas removed from conventional land-based communication (e.g., when at sea), to be able to connect with satellite networks to upload or download data. Use of satellite communication requires a balance between cost, reliability, and other factors. For example, proprietary or micro-satellites are less expensive to maintain and operate, and are particularly suitable when the IOT devices communicating with the satellite do not require constant communication or frequent communication, such as IOT devices on containers travelling at sea where infrequent communication (e.g., once daily or weekly) is sufficient. However, proprietary and micro-satellites are also less reliable and experience downtime or connection loss, which is unsatisfactory when occurring when urgent communication is needed. Accordingly, it is beneficial for the IOT device to have multiple options for communication. For example, the IOT device could primarily communicate using a proprietary or micro-satellite, and use more reliable satellites (e.g., a more expensive dedicated high-availability communication service, such as SpaceX's StarLink®) as backup when the IOT device is unable to communicate with the proprietary or micro-satellites.

Figure 14A:
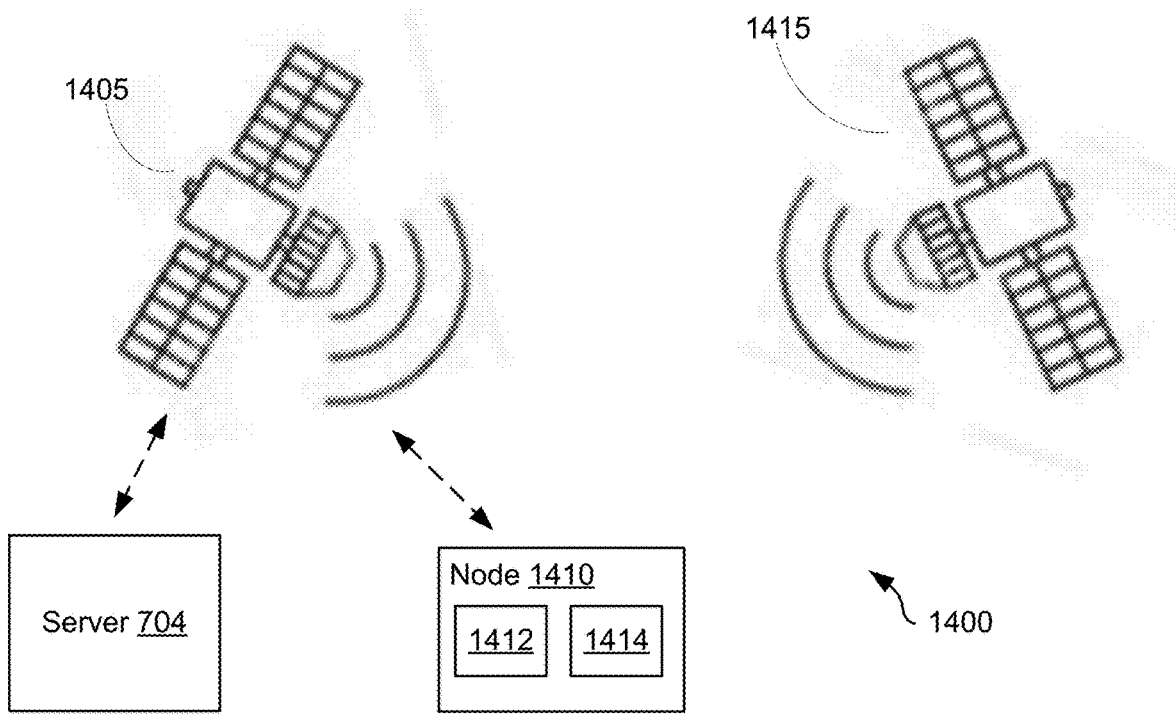
FIG. 14A is a schematic diagram illustrating one example environment of a wireless sensing system with a node that includes primary parameters and backup parameters for communicating with a primary satellite network and a backup satellite network, respectively, in embodiments.

FIG. 14A is a schematic diagram illustrating one example environment 1400 of a wireless sensing system (e.g., IOT system 700 of FIG. 7) with a node 1410 that includes primary parameters 1412 and backup parameters 1414 for communicating with a primary satellite network 1405 and a backup satellite network 1415, respectively. The node 1410 represents any one of stationary gateway node 712, FIG. 7, mobile gateway node 714, FIG. 7, or any other node described above with cellular and satellite communications capabilities, which may also be known as a black tape node for example. The primary parameters 1412 define the expected availability of the primary satellite network 1405 and the backup parameters 1414 define the availability of the backup satellite network 1415. The node 1410 uses the parameters 1412 to determine when communication with the primary satellite network 1405 is expected to be available, and communicates with the primary satellite network 1405 when needed. In some embodiments, the primary satellite network 1405 is a proprietary or micro-satellite that allows, when in a suitable position relative to the node 1410, communication between the node 1410 and other components of the sensing system, such as the server 704 of FIG. 7. However, the primary satellite network 1405 may be any satellite network designated as a primary satellite network by the sensing system.

In certain embodiments, the primary satellite network 1405 transmits a periodic heartbeat signal (e.g., a low-energy signal) that indicates its availability for communication. The node 1410 may receive the heartbeat signal from the primary satellite network 1405 when the primary satellite network 1405 is available, as defined by the primary parameters 1412. For example, during the periods of availability of the primary satellite network 1405, as defined by the primary parameters 1412, the primary satellite network 1405 may, at intervals (e.g., hourly, daily, etc.), transmit the heartbeat signal. In certain embodiments, where satellite coverage for the location of the node 1410 is continuous, the interval is zero, indicating continuous communication availability. Accordingly, the node 1410 expects to receive the heartbeat signal from the primary satellite network 1405 prior to (e.g., 1 hour prior to a scheduled data upload) a scheduled data upload is an indication that the primary satellite network 1405 is available. When the expected heartbeat signal is not received, the node 1410 may determine that communication with the primary satellite network 1405 is unavailable. Other methods for the node 1410 to detect the availability/unavailability of communication with the primary satellite network 1405 may be used without departing from the scope hereof.

In response to receiving the expected heartbeat signal from the primary satellite network 1405, the node 1410 transmits the upload data to the primary satellite network 1405, which relays the uploaded data to other components of the wireless sensing system, such as to server 704. While communication with the primary satellite network 1405 is available and successful, the node 1410 does not use the backup satellite network 1415. However, the node 1410 also includes the parameters 1414 defining availability of the backup satellite network 1415. The node 1410 communicates with the backup satellite network 1415 when the primary satellite network 1405 is unavailable or when communication with the primary satellite network 1405 is unsuccessful. Advantageously, by preconfiguring the node 1410 with both the primary parameters 1412 and the backup parameters 1414, the probability of the node 1410 successfully communicating the upload data to the server 704 is increased.

Figure 14B:
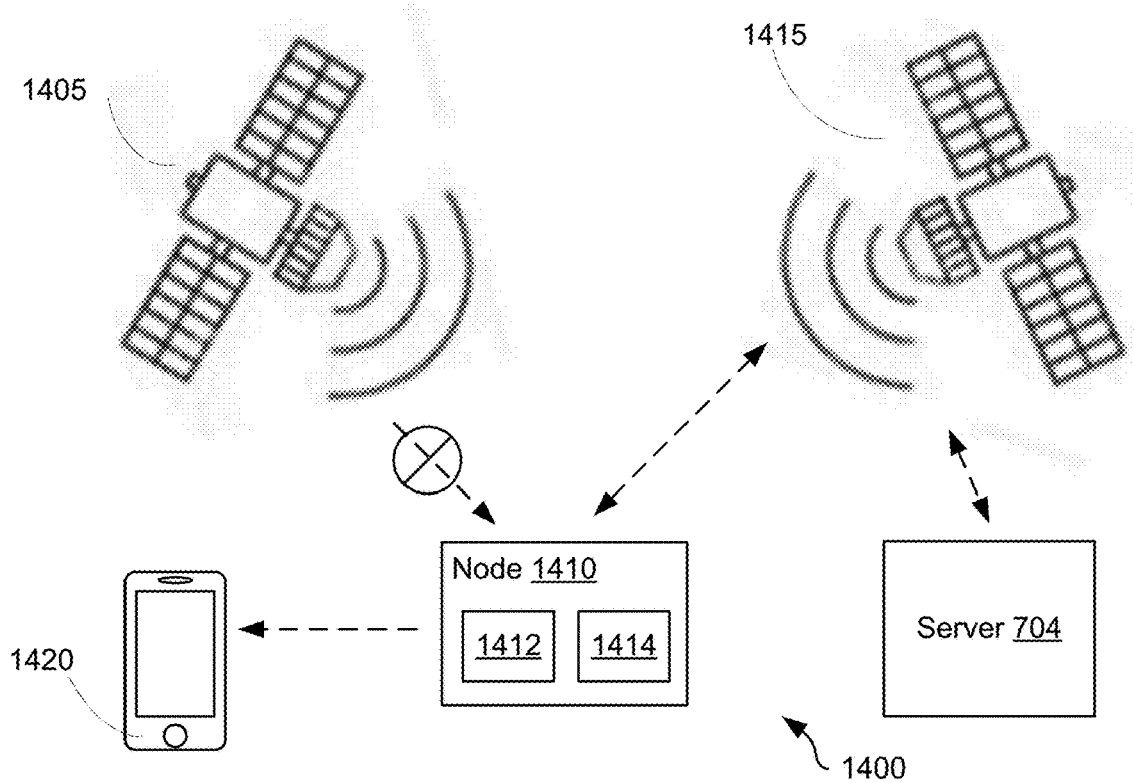
FIG. 14B is a schematic diagram illustrating the environment of FIG. 14A when the node determines that the primary satellite network is unavailable, and communicates with the backup satellite network, in embodiments.

FIG. 14B is a schematic diagram illustrating the environment 1400 of FIG. 14A when the node 1410 determines that the primary satellite network 1405 is unavailable, and communicates with the backup satellite network 1415. For example, when the node 1410 fails (for a predefined period) to receive the expected heartbeat signal from the primary satellite network 1405, the node 1410 determines that communication with primary satellite network 1405 is unavailable. For example, when the node 1410 fails to receive the expected heartbeat signal during a three-hour period, the node 1410 determines that communication with the primary satellite network 1405 is unavailable. In another example, when the expected heartbeat signal is not received for two expected communication availability periods (e.g., a two-hour window in two successive days or weeks), the node 1410 assumes that communication with the primary satellite network 1405 is unavailable.

When the node 1410 determines that expected communication with the primary satellite network 1405 is unavailable, the node 1410 sends a notification, such as a phone call or other communication, to a user device 1420 (e.g., mobile gateway 710) of the wireless sensing system indicating the unexpected unavailability of the primary satellite network 1405. In certain embodiments, the notification further identifies the backup satellite network 1415 being used (e.g., where the node 1410 is configured with multiple backup parameters 1414 that identify multiple backup satellite networks 1415 available to the node 1410), such that the user is aware of differences between the primary and backup satellite services (e.g., costs, upload or download speeds, or other factors). In certain embodiments, the node 1410 includes a priority list of backup satellite networks stored on its memory. In some embodiments, the node 1410 includes multiple priority lists sorted by different metrics, such as one or more of price, latency, known reliability (e.g., a performance score), availability based on current location of the node 1410 and coverage of the satellite system (e.g., when the navigation satellites are geosynchronous). The node 1410 may sort or reprioritize the priority list based on updated information (e.g., by checking current latency, availability, price if the price is variable, reliability, and so on). When urgency of the communication is high (e.g., when the node needs to make an urgent call or to send/receive data that is time sensitive), the node 1410 select the backup satellite network that has a lowest known latency from the priority list, to ensure the data is retrieved or delivered with minimal delay. In another example, where urgency of the communication is lower, the node 1410 may select the backup satellite network based on price. In certain embodiments, the node 1410 stores security credentials and protocols for each of the backup satellite networks within its memory. The server 704 may also store other information of the backup satellite networks, such as geographic availability/coverage, latency, reliability scores, etc., within its database. The node 1410 may store a portion of that information within its memory, where the portion is selected based upon a current mission of the node, such as an expected route or region that the node will be located in during its lifetime/job. Advantageously, the node 1410 select an appropriate backup satellite network based on its current circumstances.

As shown in FIG. 14B, the node 1410 initiates communication with the backup satellite network 1415 to upload (or download) data to (or from) the server 704.

In certain embodiments, the node 1410 is configured with multiple backup parameters 1414 that configure the node 1410 for communicating with multiple backup satellite networks 1415. For example, the parameters 1414 may define a priority and/or preference (e.g., a chain of command) that selects different ones of the multiple backup satellite networks 1415 for use when the primary satellite network 1405 is unavailable. For example, the node 1410 selects a first backup satellite network 1415 when the primary satellite network 1405 is unavailable, and selects a different backup satellite network 1415 when a first backup satellite network 1415 is also unavailable, and so forth. In certain embodiments, multiple primary and backup satellite networks 1405, 1415 are used in parallel by multiple nodes 1410 of the sensing system to minimize communications or load to any one satellite network.

In certain embodiments, the node 1410 represents one or more of a black gateway node (e.g., mobile gateway 712), a wall plug node (e.g., stationary gateway 714), a black tape node (e.g., the secondary or tertiary node 760), a black tape plus node, and other nodes having cellular and satellite communications capabilities, as shown in FIG. 7. As also shown, the sensing system 700 also includes a plurality of nodes having local, Bluetooth, or other low-range communications capabilities configured to relay data to the one or more gateway (or other) nodes for upload to the server 704 (or database 708) via the primary satellite network 1405 (or backup satellite network 1415). In certain embodiments, the node 1410 also relay data received via the primary satellite network 1405 (or backup satellite network 1415) to other nodes of the sensing system via local, Bluetooth, or other low-range communications channels.

In certain embodiments, the node 1410 is selected by the sensing system for communicating with the primary satellite network 1405 (or backup satellite network 1415). In other embodiments, the node 1410 is self-assigned, based on available local resources, to communicate with the primary satellite network 1405 (or backup satellite network 1415.) In other embodiments, the node 1410 is manually assigned to communicate with primary satellite network 1405 (or backup satellite network 1415). In other embodiments, one or more nodes configured to communicate with satellite networks are determined using other methods.

In one example of operation, the node 1410 is on a sea container (e.g., container 764) and uploads or downloads data via the primary satellite network 1405 (or backup satellite network 1415) once a day. In other examples of operation, the node 1410 is in one of a storage facility, a transportation facility, a building or business area, or the like, and uploads or downloads data via the primary satellite network 1405 (or backup satellite network 1415) at other intervals and/or at predefined times.

Figure 15:
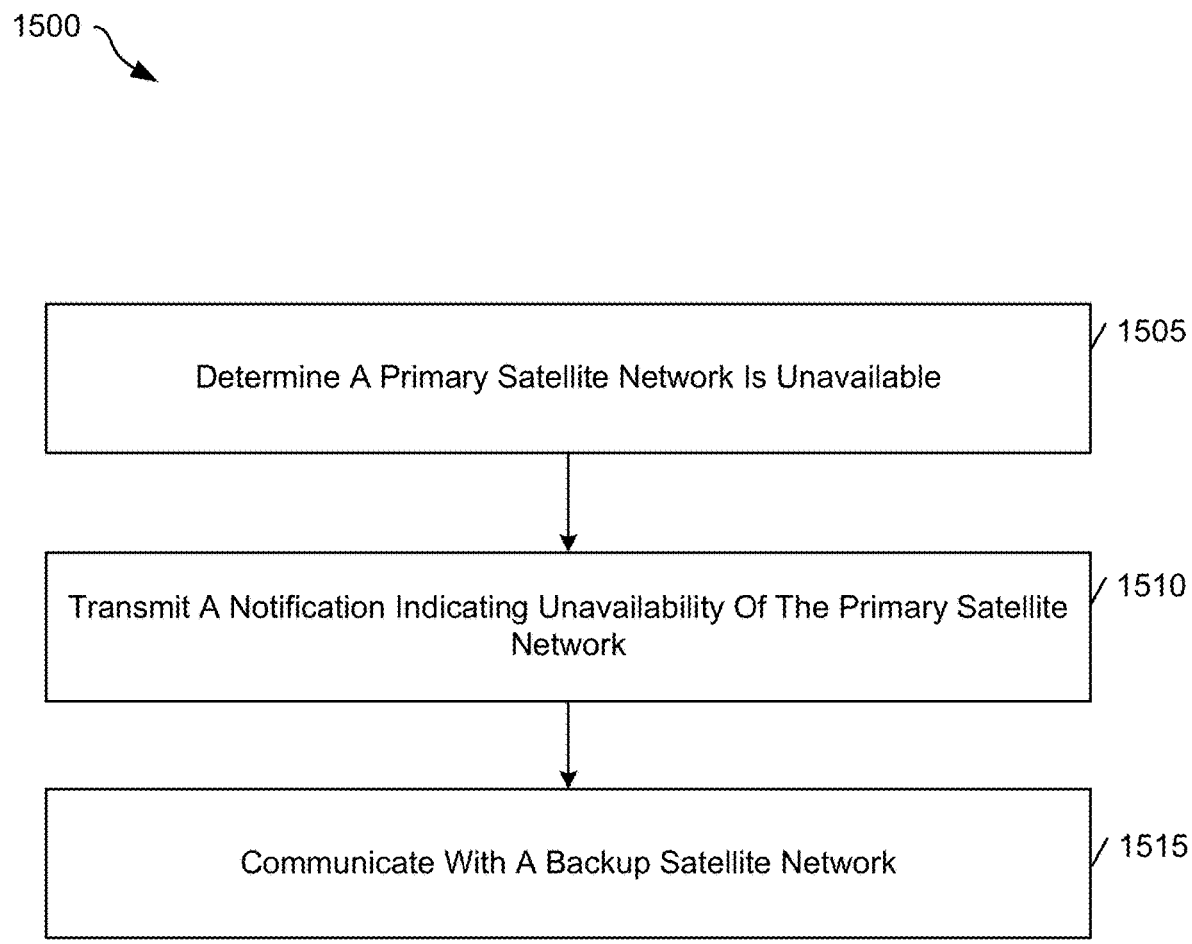
FIG. 15 is a flowchart illustrating one example method for automatically switching a node of a wireless sensing system from using a primary satellite network to using a backup satellite network, in embodiments.

FIG. 15 is a flowchart illustrating one example method 1500 for automatically switching a node of a wireless sensing system from using a primary satellite network to using a backup satellite network. The method 1500 is implemented within the node 1410 of FIG. 14, for example. In block 1505, the node 1410 determines that a primary satellite network 1405 is unavailable. In one example of block 1505, the node 1410 fails to receive the expected heartbeat signal from the primary satellite network 1405. In block 1510, the node 1410 transmits a notification indicating unavailability of the primary satellite network 1405. In one example of block 1510, the node 1410 transmits a notification to a mobile device (e.g., a smart phone, smart watch or wristband, or other computing device, such as mobile device 710, FIG. 7) to inform a user of the sensing system that the primary satellite network 1405 is unavailable. In another example of block 1510, the node 1410 transmits the notification to another node of the sensing system, which in turn notifies the mobile device of the user. In block 1515, the node establishes communication with the backup satellite network. In one example of block 1515, the node 1410 uploads data to, and/or downloads data from, the backup satellite network 1415.

In other embodiments, the method 1500 may include additional, fewer, or different steps, and the steps may be performed in a different order without departing from the scope hereof. The steps of the method 1500 may be performed by different components of the sensing system without departing from the scope hereof.

Download/Upload of Satellite Data

For asset tracking, an IOT device (e.g., master node 1051, FIG. 10C) may include a satellite navigation module (e.g., GNSS receiver 1054, FIG. 10C, GNSS receiver 1242, FIG. 12) that receives signals from navigation satellites of a GNSS to determines a current location (e.g., defined by latitude and longitude coordinates) of the IOT device. The satellite navigation module uses Ephemeris data for satellites of the GNSS that are within an operational area where the IOT device is currently located, to determine its current location based on received satellite navigation signals. For example, the Ephemeris data defines trajectory data of navigation satellites that pass over the operational area, whereby the satellite navigation module uses this trajectory data and received wireless signals from the navigation satellites to calculate its current location. When first activated in the operational area, the satellite navigation module downloads the Ephemeris data from at least one of the satellites passing over the operational area prior to being able to calculate its location. That is, without the Ephemeris data, the satellite navigation module cannot determine its location.

One aspect of the present embodiments includes the realization that receiving the Ephemeris data from the at least one satellite is a relatively lengthy process (e.g., twenty minutes) because the communication link transferring the Ephemeris data is not conventionally high-speed. Accordingly, the download of the Ephemeris data involves high energy use for a battery-powered device because, for the duration of the download, the IOT device remains operational with the satellite navigational module active. Another aspect of the present embodiments includes the realization that each IOT device in the operational area consumes battery power to download the same Ephemeris data from the satellites. Where the IOT device operates from a battery with limited capacity, the cost of downloading the Ephemeris data is high (e.g., shortening the life of the IOT device). Advantageously, the present embodiments solve this problem by having one device download the Ephemeris data for the area, and transfer the Ephemeris data to other devices using lower powered (e.g., Bluetooth) wireless communication.

Figure 16A:
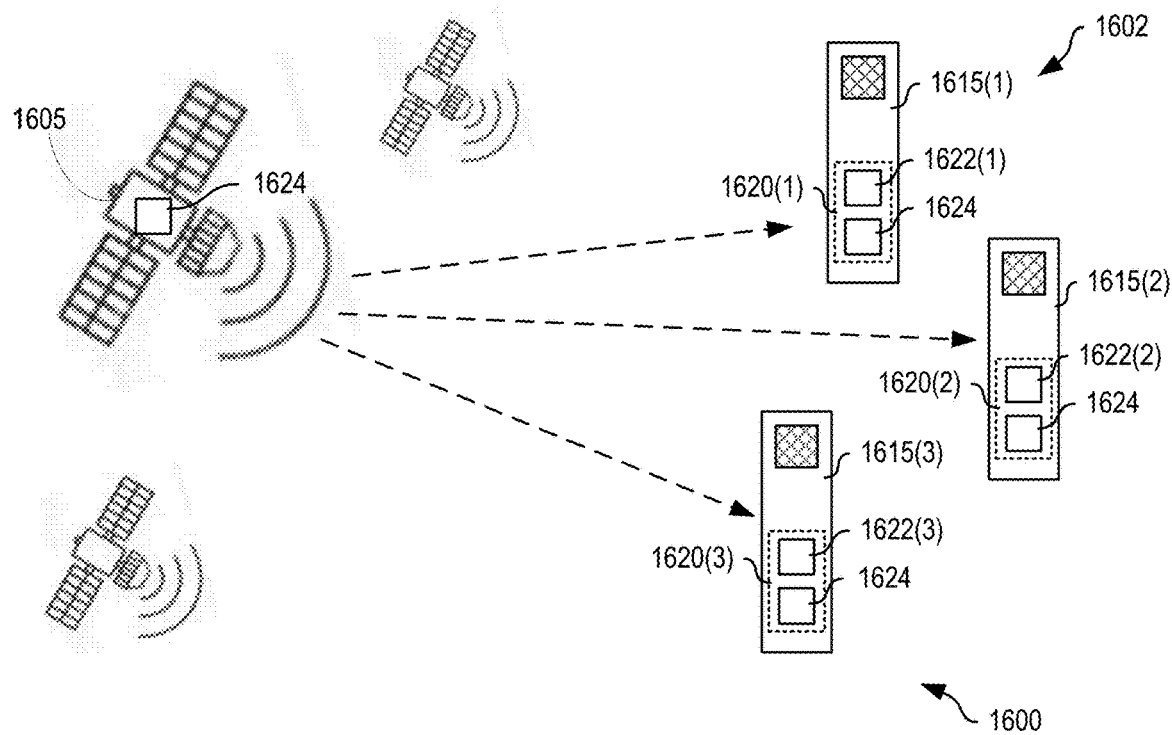
FIG. 16A is a schematic diagram illustrating conventional downloading of Ephemeris data from a navigation satellite by each of a plurality of tape nodes of a wireless sensing system, in embodiments.

FIG. 16A is a schematic diagram illustrating conventional downloading of Ephemeris data 1624 from a navigation satellite 1605 by each of a plurality of tape nodes 1615 of a wireless sensing system 1600 (e.g., system 700 of FIG. 7) that are within the same operational area 1602 (e.g., within the same building, on the same ship, in the same truck, and so on). In this example, each tape node 1615(1)–(3) includes a wireless transducing circuit 1620(1)-(3) (e.g., wireless transducing circuit 410 of FIG. 4) with a satellite navigation module 1622(1)-(3) that receives the Ephemeris data 1624 directly from the navigation satellite 1605 to enable it to initialize its GNSS functionality. After activation within the operational area 1602, each tape node 1615 independently receives the satellite signal from the navigation satellite 1605 to decode the Ephemeris data 1624. Accordingly, each tape node 1615 experiences a delay and battery usage while receiving and decoding the Ephemeris data 1624, and before being able to determine its location. In the example of FIG. 16A, all the tape nodes 1615(1)-(3) experience battery drain (while downloading the Ephemeris data 1624) that detracts from other duties and an expected useful lifespan. Where nodes 1615 only activate the satellite navigation modules at intervals (e.g., once per hour, once per day, etc.), the satellite navigation module 1622 does not receive incremental updates to the Ephemeris data from the navigation satellite 1605, and may need to redownload the Ephemeris data 1624 each time it is activated.

Figure 16B:
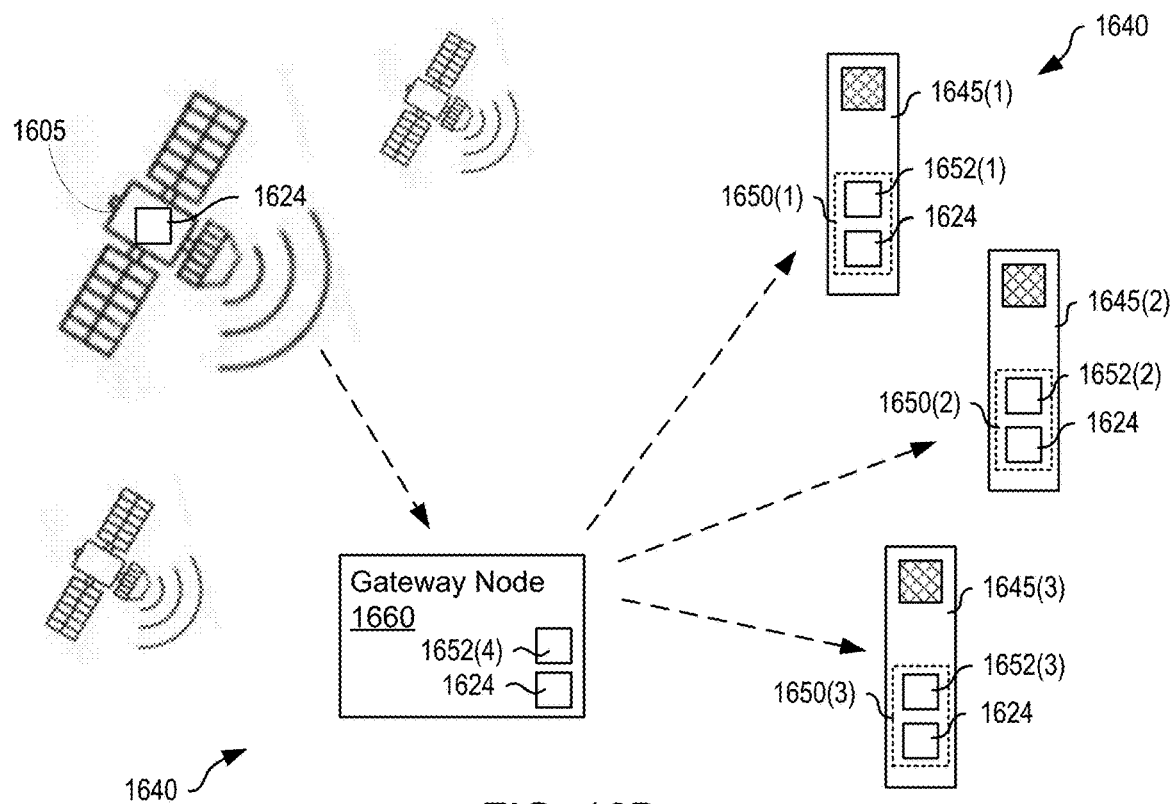
FIG. 16B is a schematic diagram illustrating one example sensing system that include a plurality of battery powered tape nodes and a gateway node for receiving Ephemeris data of a satellite navigation system for each of the tape nodes, in embodiments.

FIG. 16B is a schematic diagram illustrating one example sensing system 1640 (e.g., sensing system 700) that includes a plurality of battery powered tape nodes 1645(1)-(3) and a gateway node 1660 for receiving the Ephemeris data 1624 of a satellite navigation system for each of the tape nodes 1645(1)-(3). Each of the tape nodes 1645(1)-(3) and the gateway node 1660 includes a wireless transducing circuit 1650(1)-(3) (e.g., wireless transducing circuit 410 of FIG. 4) with a satellite navigation module 1652(1)-(4). The gateway node 1660 is assigned to receive the Ephemeris data 1624 from the navigation satellite 1605 and then distribute the Ephemeris data 1624 to the tape nodes 1645. In this example, the gateway node 1660 has cellular communication capabilities and short-range wireless communication capability. However, the gateway node 1660 may represent other types of nodes that include satellite navigation module 1652, such as one or more of a black tape node (e.g., secondary or tertiary agents 760), a plug-in node (e.g., stationary gateway 714), or any other node having a satellite navigation module. Although the gateway node 1660 is used in the example of FIG. 16B, another node of the sensing system 1640 that includes the satellite navigation module 1652 may be assigned to receive and distribute the Ephemeris data 1624. For example, it is preferable that the gateway node 1660 is a plug-in node (e.g., non-battery powered) such that it may receive and update the Ephemeris data 1624 continuously.

The gateway node 1660 receives the satellite signal and decodes the Ephemeris data 1624, storing it within its memory, for example. Once downloading and decoding of the Ephemeris data 1624 is complete, the gateway node 1660 shares the Ephemeris data 1624 with the tape nodes 1645. In one embodiment, the gateway node 1660 determines which tape nodes 1645 are in the operational area 1602 and sends them the already downloaded Ephemeris data 1624 via a local short-range (low-power) communication interface (e.g., Bluetooth or another local short-range communications protocol). Advantageously, the tape nodes 1645 receive the Ephemeris data 1624 quickly (the local wireless communication is faster than the broadcast of the Ephemeris data 1624 by the navigation satellite 1605) and without high battery or energy usage, or lengthy download times. That is, by receiving the Ephemeris data 1624 from the local gateway node 1660, none of the tape nodes 1645 are required to perform lengthy receiving of the satellite signal, thereby saving significant battery power. The low-power, short-range communication protocol used between the gateway node 1660 and the tape nodes 1645 uses less power, and is faster for transferring the Ephemeris data 1624. By using lower-power, short-range wireless communication to distribute the Ephemeris data 1624 to the tape nodes 1645, the sensing system 1640 ensures that each node 1645 receives the necessary Ephemeris data 1624 without requiring high-range communications systems.

In certain embodiments, the gateway node 1660 is a black gateway or wall plug type node having a cellular communication interface for establishing communications with other nodes 1615 of the sensing system 1640. However, the gateway node 1660 may have additional or different communication capabilities and range. In some embodiments, the gateway node 1660 is assigned by the sensing system 1640. In other embodiments, the gateway node 1660 is assigned manually by a user of the sensing system 1640. In another embodiment, the gateway node 1660 is randomly assigned by collective intelligence of the sensing system 1640 (e.g., within nodes of the sensing system 1640 or a subset of nodes of the sensing system 1640 (e.g., within a set of gateway and black tape nodes of the sensing system), or is determined by another means.

In certain embodiments, the gateway node 1660 downloads and decodes the Ephemeris data 1624, storing the Ephemeris data 1624 within its memory. Over time, the gateway node 1660 may update the Ephemeris data 1624 based on the received satellite signal. For example, the gateway node 1660 may have the satellite navigation module 1652(4) continually activated to substantially continuously receive the satellite signals, whereby any updates to the Ephemeris data receives in the satellite signal are used to update the locally stored Ephemeris data 1624. Thus, the Ephemeris data updates over time as the location of the gateway node 1660 changes.

The tape nodes 1645 may request the Ephemeris data 1624 from the gateway node 1660 as needed and use a low-powered wireless interface. For example, when the tape node 1645(2) is first activated within the operational area 1602, it may request the Ephemeris data 1624 from the gateway node 1660. In another example, as the tape node 1645(3) becomes within a threshold distance of the gateway node 1660, the tape node 1645(3) may establish communication with the gateway node 1660 and request the Ephemeris data 1624. The distance between the gateway node 1660 and the tape node 1645(3) may be determined based on time-of-flight calculations for communications exchanged between the gateway node and the tape node. In another embodiment, the gateway node 1660 distributes the Ephemeris data 1624 to the tape node 1645(3) based at least in part on a predicted future location of the tape node 1645(3). In another example, the tape node 1645(1) requests the Ephemeris data 1624 from the gateway node 1660 when it detects that its locally stored Ephemeris data 1624 is outdated (e.g., corresponding to an earlier, no longer valid, time and/or another no longer valid operational area). In another example, the gateway node 1660 sends the Ephemeris data 1624 to the tape nodes 1645, when the tape nodes 1645 are determined to be nearby, at intervals (e.g., at five-minute intervals, one-hour intervals, etc.). Where the tape nodes 1645 do not require a high granularity of location tracking (e.g., until they are within a predefined range of a designated destination location), the gateway node 1660 transmits the Ephemeris data 1624 at longer intervals.

In an embodiment, the gateway node 1660 distributes the downloaded Ephemeris data 1624 to a first set of tape nodes 1645 within communication range of the low-powered wireless communication interface. The first set of nodes 1645 (e.g., tape nodes 1645(1), (2)) then distribute the Ephemeris data 1624 to a second set of nodes (e.g., tape nodes 1645(3), etc.) of the sensing system 1640 that are within short range wireless communication range of the first set of tape nodes 1645, but that may not be within short range wireless communication range of the gateway node 1660. For example, the tape node 1645(1) may receive the Ephemeris data 1624 from the gateway node 1660 and then transmit the Ephemeris data 1624 to the tape node 1645(3).

Figure 16C:
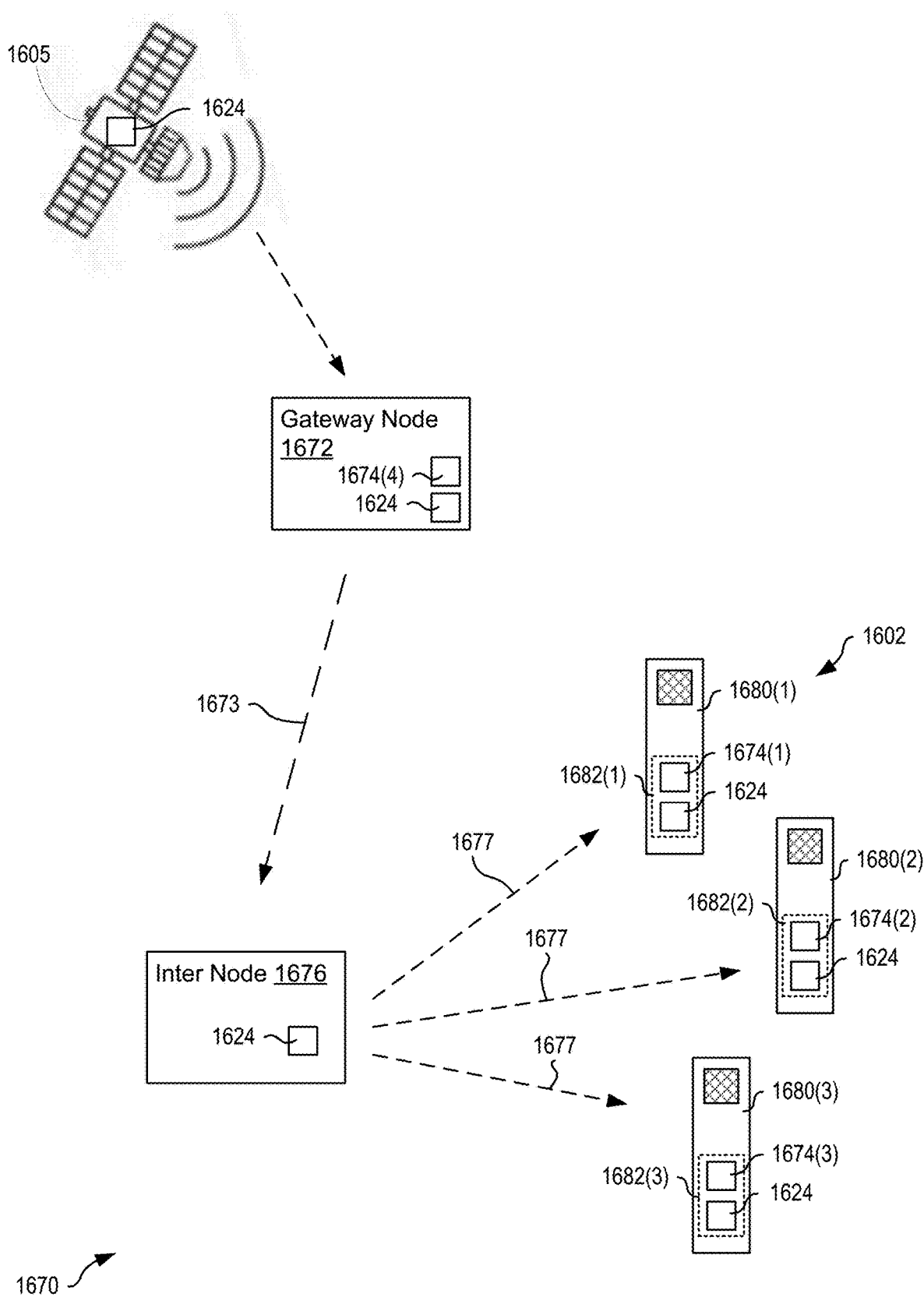
FIG. 16C is a schematic diagram illustrating one example sensing system where each of the gateway node and the tape nodes each include a wireless transducing circuit with a satellite navigation module, and further including an intermediate node for receiving Ephemeris data from the gateway node and distributing the Ephemeris data to the tape nodes, in embodiments.

FIG. 16C is a schematic diagram illustrating one example sensing system 1670 that is similar to the sensing system 1640 of FIG. 16B, where each of the gateway node 1672 and the tape nodes 1680 each include a wireless transducing circuit 1682(1)-(3) (e.g., wireless transducing circuit 410 of FIG. 4) with a satellite navigation module 1674, and the sensing system 1670 further including an intermediate node 1676 for receiving the Ephemeris data 1624 from the gateway node 1672 and distributing the Ephemeris data 1624 to the tape nodes 1680. In this example, the gateway node 1672 receives and decodes the Ephemeris data 1624 in a satellite signal from the navigation satellite 1605 and sends the Ephemeris data 1624 to the intermediate node 1676 using a medium-range or long-range communication protocol 1673. The intermediate node 1676, sends the Ephemeris data 1624 to the plurality of tape nodes 1680(1)-(3) using a short-range wireless protocol 1677. Advantageously, the tape node 1680 may be beyond the short-range wireless protocol of the gateway node 1672, but within the short-range wireless protocol 1677 of the intermediate node 1676, and thereby save battery power by receiving the Ephemeris data using their short-range wireless interface. This allows the Ephemeris data to be received by the tape nodes 1680 located over a greater range. In this example, the gateway node 1672 may represent a black gateway (e.g., mobile gateway 712 and/or stationary gateway 714) having long-range, mid-range, and short-range communications capabilities. The intermediate node may represent a mobile gateway node (e.g., mobile gateway 712), or a stationary gateway node (e.g., stationary gateway 714), such as a green node having mid-range and short-range communications capabilities. The gateway node 1672 may distribute the Ephemeris data to multiple intermediate nodes 1676, which in turn each distribute the Ephemeris data to a at least one tape node 1680. Accordingly, the Ephemeris data distribution is easily scalable. Other methods of optimizing distribution of the Ephemeris data 1624 may be used without departing from the scope hereof.

Figure 17A:
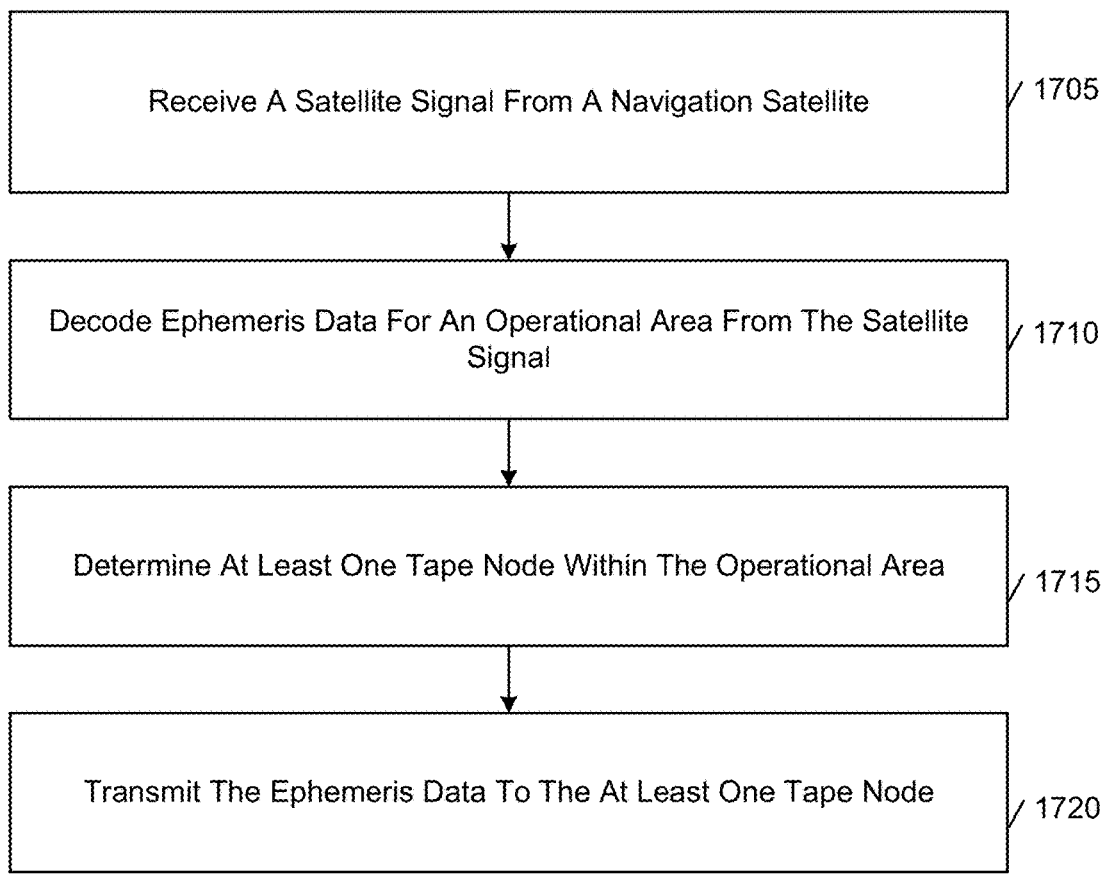
FIG. 17A is a flowchart illustrating one example method for receiving and distributing Ephemeris data used by satellite navigation modules of battery powered tape nodes of a sensing system, in embodiments.

FIG. 17A is a flowchart illustrating one example method 1700 for receiving and distributing the Ephemeris data 1624 used by satellite navigation modules 1652 of battery powered tape nodes 1645 of a sensing system 1640, in embodiments. In block 1705, the method 1700 receives a satellite signal from a navigation satellite. In one example of block 1705, the gateway node 1660 enables satellite navigation module 1652(4) to receive a wireless signal from the navigation satellite 1605. In block 1710, the method 1700 decodes Ephemeris data for an operational area from the satellite signal. In one example of block 1710, the gateway node 1660 decodes, from the satellite signal received in block 1705, the Ephemeris data 1624 for the operational area 1602. In block 1715, the method 1700 determines at least one tape node within the operational area. In one example of block 1715, the gateway node 1660 determines tape nodes 1645(1)-(3) are within the operational area 1602. In block 1720, the method 1700 transmits the Ephemeris data to the at least one tape node. In one example of block 1720, the gateway node 1660 uses a low-power wireless interface to transmit the Ephemeris data 1624 to the tape nodes 1645 (1)-(3).

In other embodiments, the method 1700 may include additional, fewer, or different steps, and the steps may be performed in a different order without departing from the scope hereof. The steps of the method 1700 may be performed by different components of the sensing system without departing from the scope hereof.

Figure 17B:
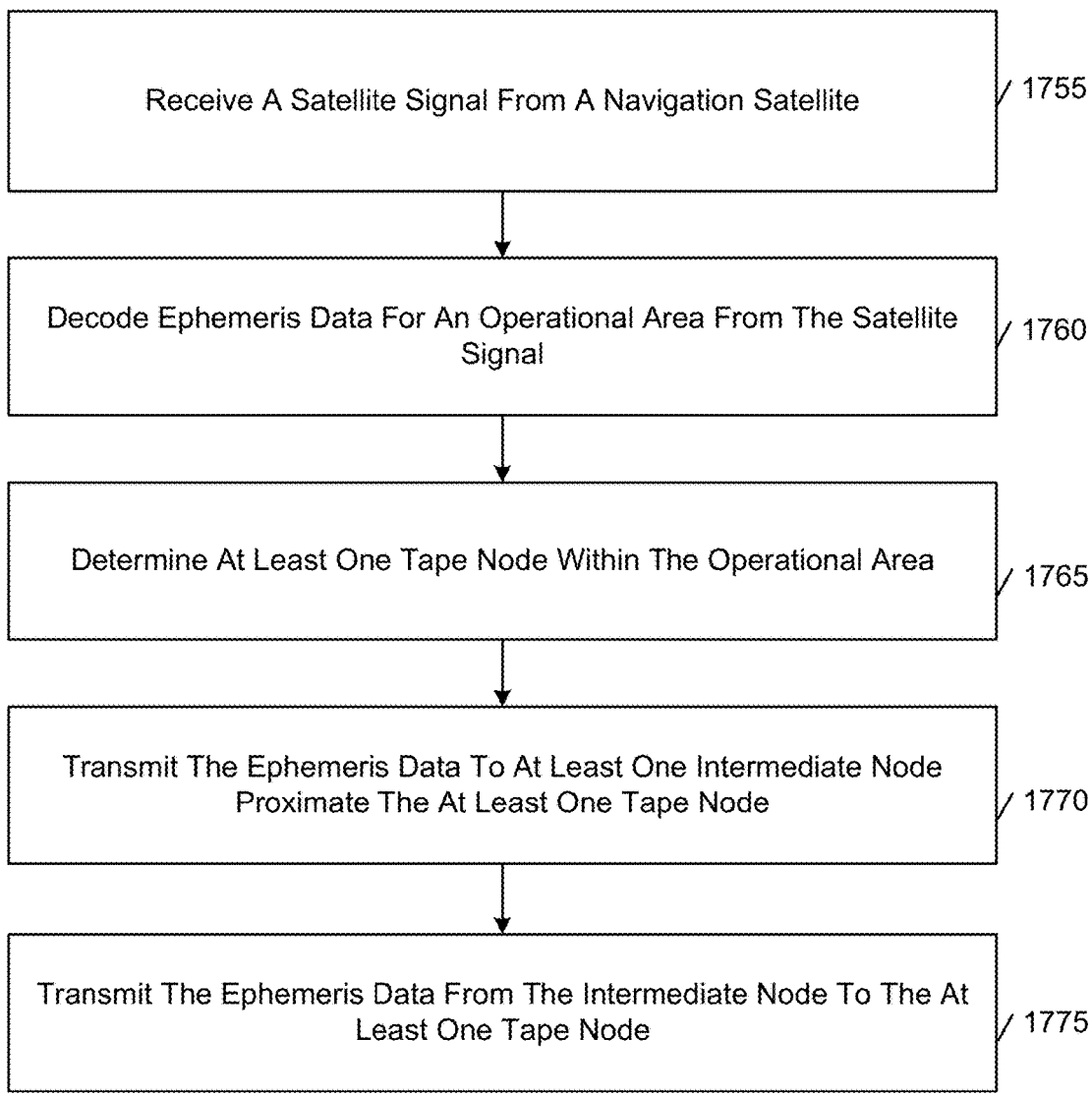
FIG. 17B is a flowchart illustrating one example method for receiving and distributing Ephemeris data used by satellite navigation modules of battery powered tape nodes of a sensing system via an intermediate node, in embodiments.

FIG. 17B is a flowchart illustrating one example method 1750 for receiving and distributing the Ephemeris data 1624 used by satellite navigation modules 1674 of battery powered tape nodes 1680 of a sensing system 1670 via an intermediate node 1676, in embodiments. In block 1755, the method 1750 receives a satellite signal from a navigation satellite. In one example of block 1755, the gateway node 1672 enables satellite navigation module 1674(4) to receive a wireless signal from the navigation satellite 1605. In block 1760, the method 1750 decodes Ephemeris data for an operational area from the satellite signal. In one example of block 1760, the gateway node 1660 decodes, from the satellite signal received in block 1755, the Ephemeris data 1624 for the operational area 1602. In block 1765, the method 1750 determines at least one tape node within the operational area. In one example of block 1765, the gateway node 1672 determines tape nodes 1680(1)-(3) are within the operational area 1602. In block 1770, the method 1750 transmits the Ephemeris data to at least one intermediate node proximate the at least one tape node. In one example of block 1770, the gateway node 1672 transmits the Ephemeris data 1624 to the intermediate node 1676. In block 1775, the method 1750 transmits the Ephemeris data from the intermediate node to the at least one tape node. In one example off block 1775, the intermediate node 1676 uses a low-power wireless interface to transmit the Ephemeris data 1624 to the tape nodes 1680(1)-(3).

In other embodiments, the method 1750 may include additional, fewer, or different steps, and the steps may be performed in a different order without departing from the scope hereof. The steps of the method 1750 may be performed by different components of the sensing system without departing from the scope hereof.

Figure 18A:
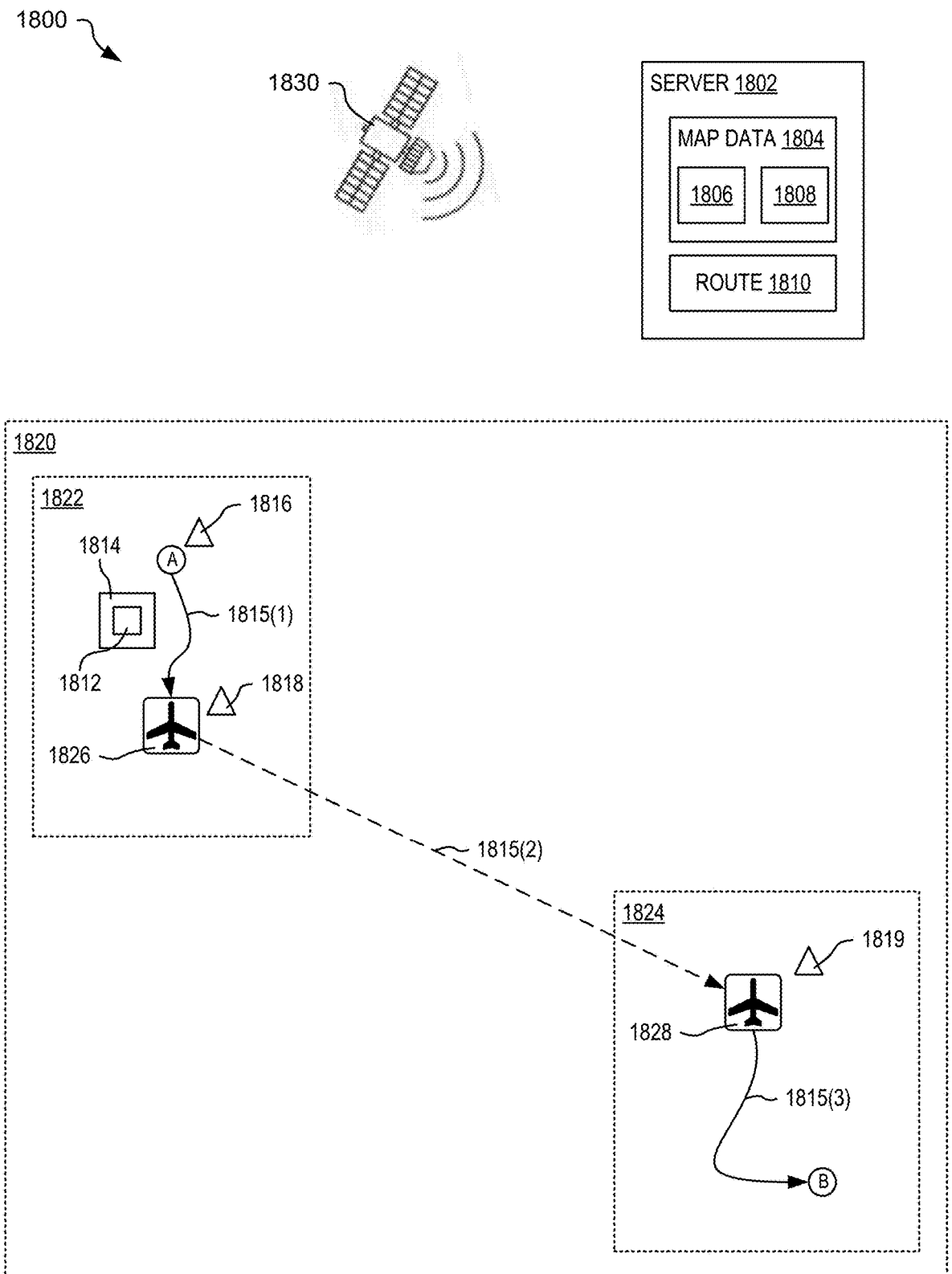
FIG. 18A is a schematic diagram illustrating one example wireless sensing system distributing a mapping file to a tape node based on a predefined route of the tape node, in embodiments.

FIG. 18A is a schematic diagram illustrating one example wireless sensing system 1800 for distributing at least one mapping file to a tape node based on a known (e.g., predefined or expected) route of the tape node, in embodiments. The wireless sensing system 1800 (e.g., sensing system 700, FIG. 7) include at least one server 1802 (e.g., server 704), at least one gateway node 1816 (e.g., mobile gateway 712 or stationary gateway 714), and at least one tape node 1812 (e.g., tape node 718, 728, 732, 724-748, 760, 766), attached to an asset 1814 (e.g., asset 720, 730, 734, 750-756) or container being transported or shipped. The server 1802 stores mapping data 1804 for a region 1820 (e.g., area of operation of the wireless sensing system 1800) that may be downloaded, at least in part, to the tape node 1812. The server 1802 may store an expected route 1810 (e.g., based on a tracking number for an associated shipment of asset 1814) of tape node 1812 during transport of asset 1814 from a starting location A to a destination location B. In the example of FIG. 18A, route 1810 defines a first stage 1815(1) of the journey of the asset 1814 by road vehicle from location A to a first airport 1826; a second stage 1815(2) of the journey by aircraft from the first airport 1826 to a second airport 1828; and a final stage 1815(3) of the journey by road vehicle from the second airport 1828 to the destination location B. The route 1810 may have more or fewer stages based on how the asset is transported.

The server 1802 determines which portions of mapping data 1804 are needed by the tape node 1812 based upon the stages of the route 1810 in which the tape node 1812 will actively track the location of the asset 1814. In the example of FIG. 18A, the tape node 1812 will track the location of the asset 1814 within a first area 1822 of region 1820 that corresponds to the first stage of the route 1810. Accordingly, the server 1802 generates a first mapping file 1806 that include that includes at least the location A and the first airport 1826. Since the tape node 1812 is not expected to track the location of the asset 1814 during the second stage of the route 1810, when the asset is within a aircraft, server 1802 does not generate a mapping file for second stage 1815(2). The tape node 1812 is expected to track the asset 1814 within a second area 1824 of region 1820 that includes the third stage 1815(3) of the route 1810, and therefore the server 1802 uses mapping data 1804 to generate a second mapping file 1808 corresponding to the second area 1824 that includes at least the second airport 1828 and the final destination B.

In one example of operation, the server 1802 sends the first mapping file 1806 to the tape node 1812, prior to the tape node 1812 starting its journey (e.g., when tape node 1812 is initialized), via a gateway 1816 at location A and a satellite network 1830. For example, the first mapping file 1806 may be addressed to a unique identifier of the tape node 1812, whereby the gateway 1816 sends the first mapping file 1806 to the tape node with that unique identifier. The communication between the gateway 1816 and the tape node 1812 uses a low-power wireless interface (e.g., low-power communications-interface 652 of FIG. 6A), for example. When tape node 1812 has sufficient internal storage, the server 1802 may also send the second mapping file 1808 to the tape node 1812 via the gateway 1816.

In a second example of operation, the server 1802 sends the first mapping file 1806 to the tape node 1812, prior to the tape node 1812 starting its journey, and when the tape node 1812 reaches the first airport 1826, the server 1802 may send the second mapping file to the tape node 1812 via a second gateway 1818 at the airport. Advantageously, the tape node 1812 is prepared ahead of time to track the third stage 1815(3) of the route 1810.

In a third example of operation, the server 1802 sends the first mapping file 1806 to the tape node 1812, prior to the tape node 1812 starting its journey, and sends the second mapping file to the tape node 1812 via a third gateway 1819 at the second airport 1828 when the tape node 1812 reaches the second airport 1828.

Advantageously, the tape node 1812 is preloaded with a mapping file (e.g., mapping data) prior to a start of the corresponding stage 1815 of the route 1810. In certain embodiments, the gateway 1816/1818/1819 receives many mapping files 1806/1808 for many different tape nodes and uses a unique identifier of each tape node to deliver the appropriate mapping file to the tape node. In certain embodiments, each gateway 1816/1818/1819 is preloaded with mapping files corresponding to common stages 1815 of routes, whereby the tape node provides a unique identifier for a next state of its route and the gateway sends a corresponding mapping file to the tape node.

Although mapping files are used in the example of FIG. 18A, the server may send other location and/or time dependent data to the tape node based on the route 1810 of the tape node 1812. For example, the data could include one or more of weather data, re-routing instructions for the asset, infrastructure locations (e.g., data defining a location of a next gateway node on the route 1810 that may be used to receive further data), and so on. For example, when the gateway 1816 provides mapping file 1806 corresponding to the first stage 1815(1), it may also provide data defining a location of gateway 1818 from where the tape node 1812 will receive the second mapping file 1808.

Figure 18B:
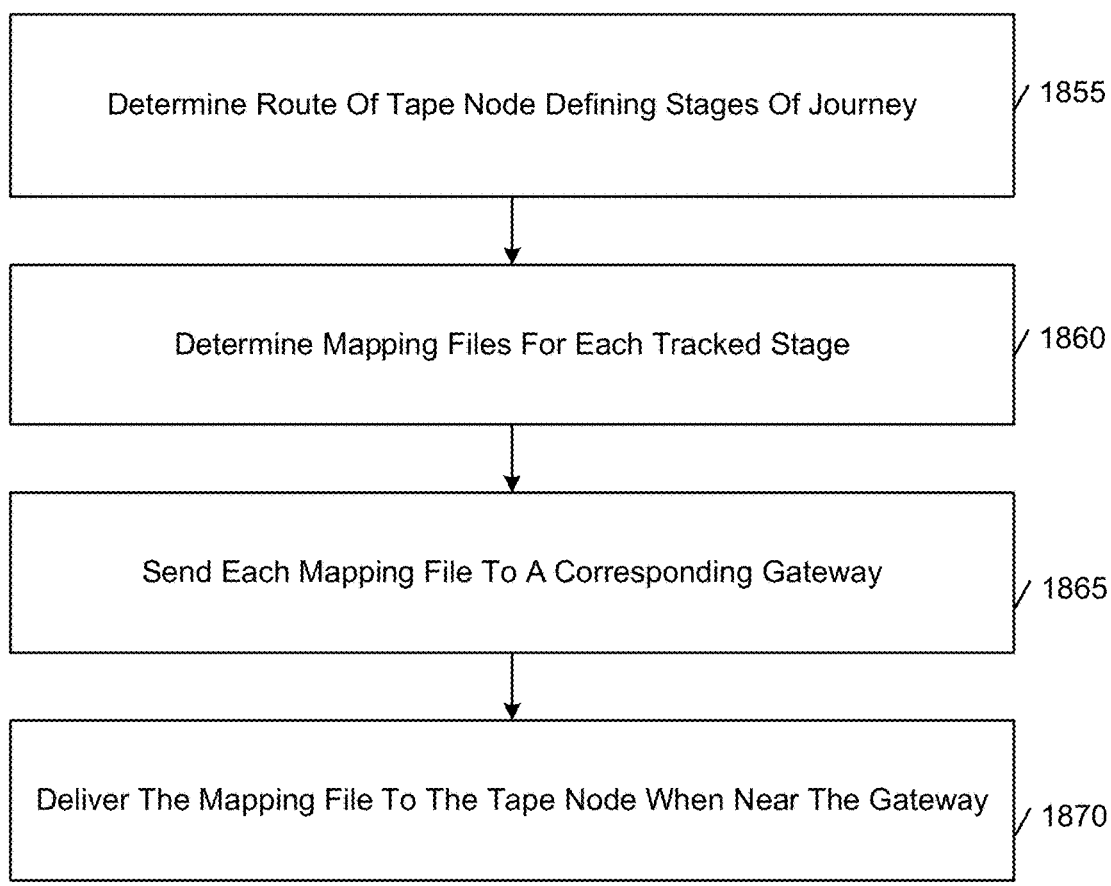
FIG. 18B is a flowchart illustrating one example method for distributing a mapping file to a tape node based on a route of the tape node, in embodiments.

FIG. 18B is a flowchart illustrating one example method 1850 for distributing a mapping file to a tape node based on a route of the tape node, in embodiments. Method 1850 is implemented within one or more of server 1802 and gateways 1816/1818/1819.

In block 1855, the method determines a route of the tape node defining the stages of the journey. In one example of block 1855, the server 1802 determines the route 1810 based on a tracking number for a shipment associated with the asset 1814 and/or the tape node 1812. In block 1860, the method 1850 determines mapping files for each tracked stage. In one example of block 1860, the server 1802 generates the first mapping file 1806 corresponding to the first stage 1815(1) and generate the second mapping file 1808 corresponding to the third stage 1815(3).

In block 1865, the method 1850 sends each mapping file to a corresponding gateway. In one example of block 1865, the server 1802 sends the first mapping file 1806 to the gateway 1816, via the satellite network 1830, and sends the second mapping file 1808 to the gateway 1818 via the satellite network 1830. In block 1870, the method 1850 delivers the mapping file to the tape node when near the gateway. In one example of block 1870, when the tape node 1812 is near the gateway 1816, the gateway 1816, based on the unique identity of the tape node 1812, transfers the first mapping file 1806 to the tape node 1812, and when tape node 1812 is near the gateway 1818, the gateway 1818, based on the unique identity of the tape node 1812, transfers the second mapping file 1808 to the tape node 1812.

Figure 19:
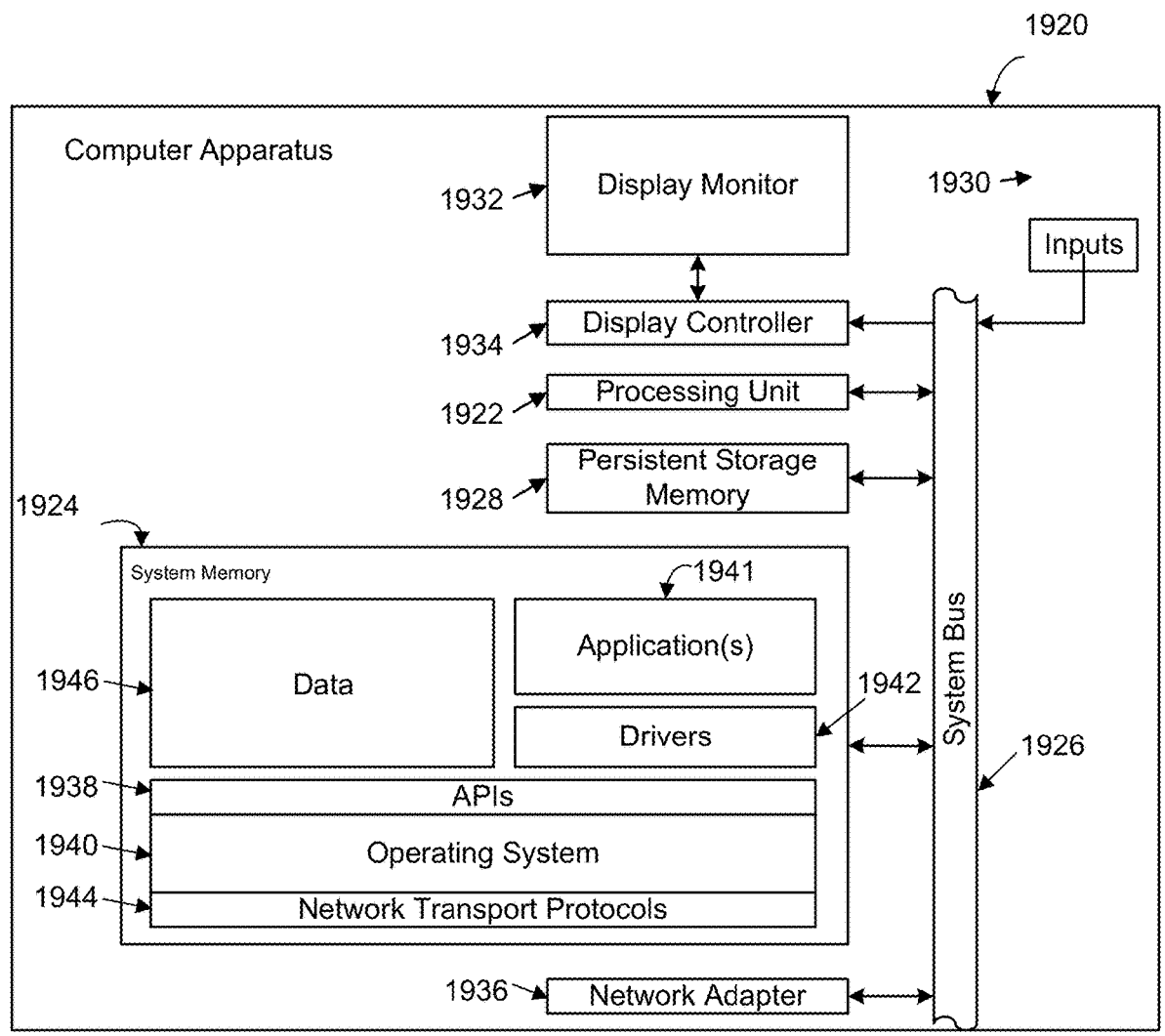
FIG. 19 shows an example embodiment of computer apparatus that, either alone or in combination with one or more other computing apparatus, is operable to implement one or more of the computer systems described in this specification, in embodiments.

FIG. 19 shows an example embodiment of computer apparatus 1920 that, either alone or in combination with one or more other computing apparatus, is operable to implement one or more of the computer systems described in this specification. For example, computer apparatus 1920 may represent any of. . . . The computer apparatus 1920 includes a processing unit 1922, a system memory 1924, and a system bus 1926 that couples the processing unit 1922 to the various components of the computer apparatus 1920. The processing unit 1922 may include one or more data processors, each of which may be in the form of any one of various commercially available computer processors. The system memory 1924 includes one or more computer-readable media that typically are associated with a software application addressing space that defines the addresses that are available to software applications. The system memory 1924 may include a read only memory (ROM) that stores a basic input/output system (BIOS) that contains start-up routines for the computer apparatus 1920, and a random-access memory (RAM). The system bus 1926 may be a memory bus, a peripheral bus, or a local bus, and may be compatible with any of a variety of bus protocols, including PCI, VESA, Microchannel, ISA, and EISA. The computer apparatus 1920 also includes a persistent storage memory 1928 (e.g., a hard drive, a floppy drive, a CD ROM drive, magnetic tape drives, flash memory devices, and digital video disks) that is connected to the system bus 1926 and contains one or more computer-readable media disks that provide non-volatile or persistent storage for data, data structures and computer-executable instructions.

A user may interact (e.g., input commands or data) with the computer apparatus 1920 using one or more input devices 1930 (e.g. one or more keyboards, computer mice, microphones, cameras, joysticks, physical motion sensors, and touch pads). Information may be presented through a graphical user interface (GUI) that is presented to the user on a display monitor 1932, which is controlled by a display controller 1934. The computer apparatus 1920 also may include other input/output hardware (e.g., peripheral output devices, such as speakers and a printer). The computer apparatus 1920 connects to other network nodes through a network adapter 1936 (also referred to as a "network interface card" or NIC).

A number of program modules may be stored in the system memory 1924, including application programming interfaces 1938 (APIs), an operating system (OS) 1940 (e.g., the Windows® operating system available from Microsoft Corporation of Redmond, Washington U.S.A.), software applications 1941 including one or more software applications programming the computer apparatus 1920 to perform one or more of the steps, tasks, operations, or processes of the positioning and/or tracking systems described herein, drivers 1942 (e.g., a GUI driver), network transport protocols 1944, and data 1946 (e.g., input data, output data, program data, a registry, and configuration settings).

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for distributing Ephemeris data of a satellite navigation system to at least one tape node of a wireless sensing system, comprising:
   receiving, by a gateway node of the wireless sensing system, a wireless satellite signal from at least one navigation satellite;
   decoding, by the gateway node, the Ephemeris data from the wireless satellite signal; and
   transmitting, by the gateway node, the Ephemeris data to the at least one tape node via a low-powered wireless communication interface.

2. The method of claim 1, wherein the gateway node is pluggable into a power socket associated with one or more of: a location, a vehicle, and an asset.

3. The method of claim 1, the Ephemeris data defining trajectory data of satellites of the satellite navigation system for an operational area that includes a location of the gateway node.

4. The method of claim 3, further comprising determining the at least one tape node is within the operational area.

5. The method of claim 1, the Ephemeris data being used by a satellite navigation module of the at least one tape node, wherein the Ephemeris data is usable by the satellite navigation module to determine a current location of the at least one tape node based upon navigation signals received from at least three navigation satellites of the satellite navigation system.

6. The method of claim 5, inputting the Ephemeris data to the satellite navigation module such that the satellite navigation module is immediately operable to determine a current location from signals received from at least three navigation satellites of the satellite navigation system.

7. The method of claim 1, further comprising decoding the wireless satellite signal within a satellite navigation module of the gateway node to generate the Ephemeris data.

8. The method of claim 7, further comprising decoding subsequently received signals from the at least one navigation satellite to update the Ephemeris data.

9. The method of claim 1, wherein the step of transmitting the Ephemeris data to the at least one tape node comprising transmitting the Ephemeris data to an intermediate node of the wireless sensing system, and transmitting the Ephemeris data from the intermediate node to the at least one tape node using the low-powered wireless communication interface.

10. The method of claim 9, wherein the step of transmitting the Ephemeris data to the intermediate node comprising transmitting the Ephemeris data to the intermediate node using a medium-powered wireless interface of the gateway node.

11. The method of claim 9, wherein the step of transmitting the Ephemeris data to the intermediate node comprising transmitting the Ephemeris data to the intermediate node using a high-powered wireless interface of the gateway node.

12. The method of claim 1, further comprising transmitting the Ephemeris data from the at least one tape node to a second tape node via a low-powered communication interface of the at least one tape node.

13. A gateway node for distributing Ephemeris data of a global navigation satellite system (GNSS) to at least one tape node of a wireless sensing system, comprising:
 a GNSS module;
 a low-powered wireless communication interface;
 a processor; and
 a memory storing machine readable instructions that when executed by the processor cause the processor to:
  receive, using the GNSS module, the Ephemeris data in a wireless satellite signal from at least one navigation satellite;
  transmit the Ephemeris data to the at least one tape node using the low-powered wireless communication interface;
  wherein the at least one tape node determines a current location from navigation satellite signals using the Ephemeris data without downloading the Ephemeris data from the at least one navigation satellite.

14. The gateway node of claim 13, further comprising a satellite navigation module, wherein the receiving the Ephemeris data comprises decoding the received wireless satellite signal within the satellite navigation module to generate the Ephemeris data.

15. The gateway node of claim 14, wherein the machine readable instructions, when executed by the processor, further cause the processor to decode subsequently received signals from the at least one navigation satellite to update the Ephemeris data.

16. The gateway node of claim 13, further comprising a battery that supplies electrical power to one or more of the GNSS module, the low-powered wireless communications interface, the processor, and the memory.

17. The gateway node of claim 13, further comprising a high-powered wireless communication interface having a wireless communication range that is higher than a wireless communication range of the low-powered wireless communications interface.

18. The gateway node of claim 13, wherein the gateway node is pluggable into a power socket to receive electrical power, the power socket associated with one or more of: a location, a vehicle, and an asset.

19. The gateway node of claim 13, the Ephemeris data defining trajectory data of satellites of the satellite navigation system for an operational area that includes a location of the gateway node.

20. The gateway node of claim 13, wherein the gateway node is a type of flexible tape node, the gateway node further comprising:
 a flexible substrate;
 a flexible cover layer;
 a device layer between the flexible substrate and the flexible cover layer, wherein the GNSS module, the low-powered wireless communication interface, the processor, and the memory are located in the device layer; and
 a battery powering one or more components in the device layer.

* * * * *